(12) United States Patent
Rassoolkhani et al.

(10) Patent No.: US 8,764,472 B2
(45) Date of Patent: *Jul. 1, 2014

(54) MOTOR PROGRAMMING TOOL

(71) Applicant: Nidec Motor Corporation, St. Louis, MO (US)

(72) Inventors: Payman Rassoolkhani, St. Louis, MO (US); Chetan O. Modi, St. Louis, MO (US); Charles L. Geiler, Caseyville, IL (US); Robert J. Ploof, Jr., Collinsville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,595

(22) Filed: Jan. 2, 2014

(65) Prior Publication Data

US 2014/0117783 A1 May 1, 2014

Related U.S. Application Data

(63) Continuation of application No. 13/710,098, filed on Dec. 10, 2012, now Pat. No. 8,632,353, which is a continuation-in-part of application No. 13/198,531, filed on Aug. 4, 2011, now Pat. No. 8,328,562.

(51) Int. Cl.
*H01R 13/627* (2006.01)

(52) U.S. Cl.
USPC .................... 439/347; 439/700; 439/924.2

(58) Field of Classification Search
CPC ............. H01R 13/6275; H01R 13/639; H01R 2201/26
USPC ........ 439/358, 347, 34, 501, 502, 700, 924.2; 320/104, 113, 115, 109
See application file for complete search history.

(56) References Cited

U.S. PATENT DOCUMENTS

| | | | | |
|---|---|---|---|---|
| 3,602,009 A | * | 8/1971 | Powell | 464/52 |
| 5,137,462 A | * | 8/1992 | Casey et al. | 439/74 |
| 5,204,565 A | * | 4/1993 | Sekine et al. | 310/71 |
| 5,306,999 A | * | 4/1994 | Hoffman | 320/109 |
| 5,341,812 A | * | 8/1994 | Allaire et al. | 600/508 |
| 5,385,480 A | * | 1/1995 | Hoffman | 439/310 |
| 5,584,715 A | * | 12/1996 | Ehrenfels | 439/222 |
| 6,168,881 B1 | * | 1/2001 | Fischer et al. | 429/97 |
| 6,459,234 B2 | * | 10/2002 | Kajiura | 320/109 |
| 6,924,514 B2 | * | 8/2005 | Suenaga | 257/98 |
| 6,943,527 B2 | * | 9/2005 | Liu et al. | 320/107 |
| 7,077,708 B1 | * | 7/2006 | Johnson et al. | 439/687 |
| 8,328,562 B1 | * | 12/2012 | Rassoolkhani et al. | 439/34 |

* cited by examiner

*Primary Examiner* — Neil Abrams
*Assistant Examiner* — Phuongchi T Nguyen
(74) *Attorney, Agent, or Firm* — Hovey Williams LLP

(57) ABSTRACT

A motor programming tool is disclosed for associating with a connection block of a motor and sending signals to a programmable controller of the motor, where the connection block includes a plurality of terminals coupled to the controller. The programming tool includes a tool body with an interface generally corresponding with the connection block of the motor, wiring operable to carry the signals, and a plurality of terminal connecting assemblies to associate with the motor terminals. The tool body includes a shiftable locking mechanism operable to selectively secure the tool body relative to the electrical connection block of the motor. The locking mechanism includes a pivotable latch moveable between an open position, wherein the connecting assemblies are freely moveable into and out of contact with the motor terminals, and a closed position, wherein at least a portion of the pivotable latch is in contact with the motor and the connecting assemblies are restricted from moving out of contact with the motor terminals.

31 Claims, 16 Drawing Sheets

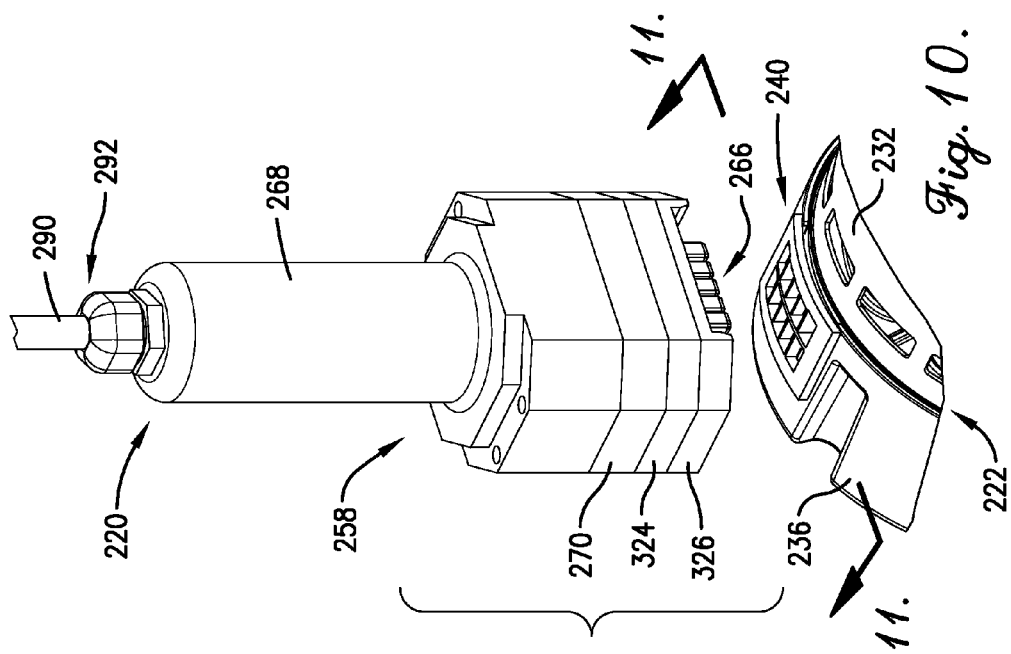
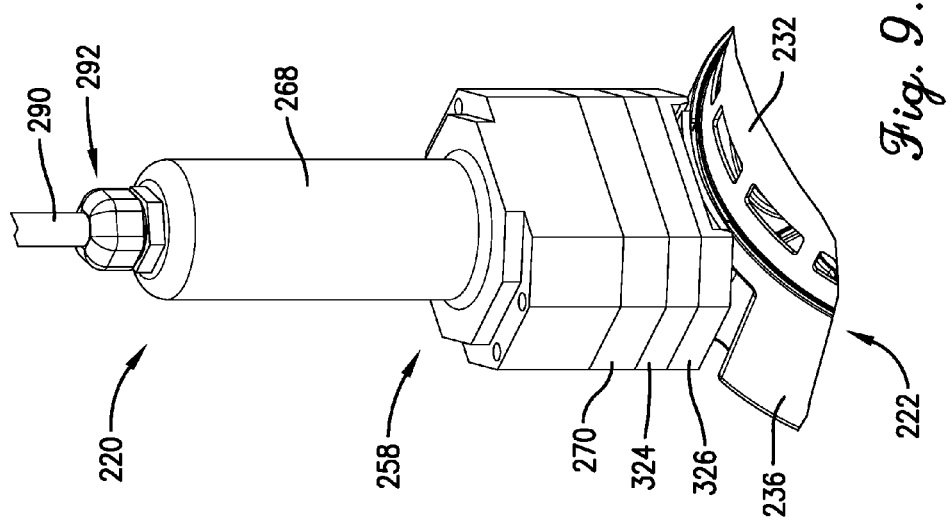

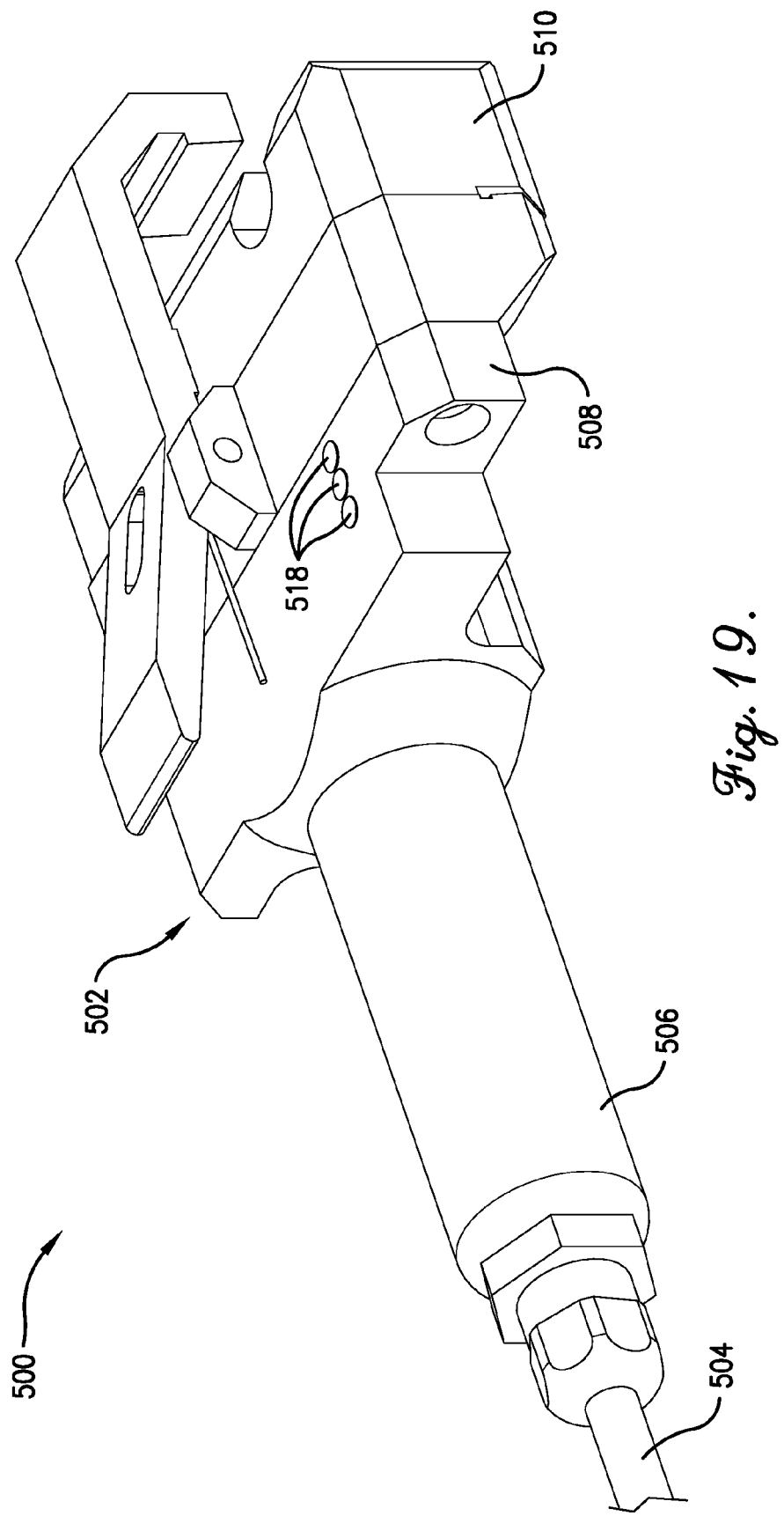

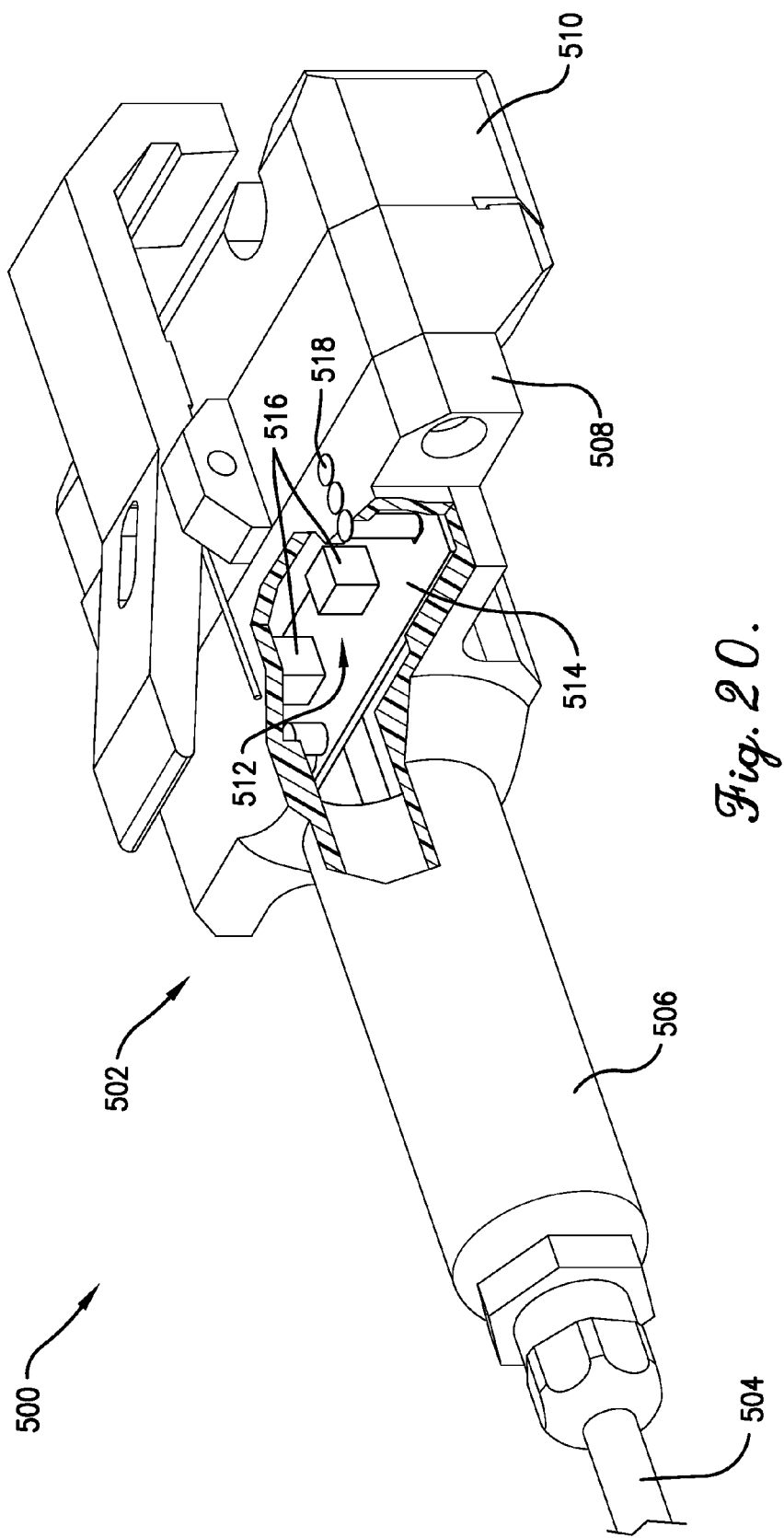

MOTOR PROGRAMMING TOOL

RELATED APPLICATIONS

This non-provisional patent application is a continuation of U.S. patent application Ser. No. 13/710,098 entitled MOTOR PROGRAMMING TOOL, filed Dec. 10, 2012, which is a continuation-in-part of U.S. patent application Ser. No. 13/198,531, filed Aug. 4, 2011, entitled MOTOR PROGRAMMING TOOL, which is now U.S. Pat. No. 8,328,562. This application claims priority benefit with regard to all common subject matter of the earlier-filed U.S. patent application. Each of the earlier-filed applications is hereby incorporated by reference in its entirety into the present application.

BACKGROUND OF THE INVENTION

1. Field of the Invention

The present invention relates generally to a tool for programming electric motor controllers. More specifically, the present invention concerns a motor programming tool for temporarily associating with an electrical connection block of a motor to send electrical signals to a programmable controller of the motor.

2. Discussion of the Prior Art

Those of ordinary skill in the art will appreciate that electric motors typically include a controller that governs parameters of how the motor operates (e.g., speed). The motor controller may be programmable, which can allow a motor with a given physical construction to be programmed to operate in a certain desirable manner, as may be particularly advantageous when the motor is coupled with a driven machine (e.g., a blower or a compressor). In this way, a number of motors, which otherwise may be physically alike, can each operate differently based on the settings of the programmable controller. Since many machines driven by motors are optimized when the motor associated therewith operates at certain conditions, it is typically necessary to program the motor controller, either during initial assembly or during coupling with the driven machine.

As will also be readily appreciated, motors conventionally include an electrical connection block that is configured to receive power and operational control signals during operation. Often, this connection block includes a molded connector with a plurality of terminals coupled to the controller. Traditionally, known motor programming tools have been configured to simply "plug in" to the motor terminals of the connection block. In other words, conventional motor programming tools have included a plurality of sockets (receptacles or other corresponding terminals) that correspond with and are configured to receive the motor terminals (or vice versa). These programming tools are then "unplugged" following completion of programming the controller.

While prior art motor programming tools have been satisfactory in some respects, the required plugging and unplugging of the mating terminals has also presented drawbacks. These established connection systems are time consuming and require significant insertion and separation force to connect and then remove the mating terminals and sockets. As is generally known in the art, the mating terminals and sockets provided between the motor connection block and existing programming tools are not particularly suited for multiple plugging and unplugging operations during the life span of the components.

Such repeated plugging and unplugging operations can damage the components, rendering either the terminals of the motor connection block or the sockets of the programming tool (or both) unusable. In the case of damaged terminals of the motor connection block, the assembled motor must be at least partially disassembled so that the terminals (or the entire connection block) may be replaced. Similarly, in the case of damaged sockets of the programming tool, the affected sockets must be replaced. Since these sockets have traditionally been crimped, soldered, or otherwise permanently connected to wiring of the tool, such repair (requiring reconstruction of these permanent wiring connections just to replace damaged sockets) is time consuming and results in significant downtime in the useful life of the programming tool.

SUMMARY

The present invention provides a motor programming tool for associating with a connection block of a motor and sending signals to a programmable controller of the motor. The inventive motor programming tool is easy to use, provides fast and consistent operation, and features a longer useful tool life than prior art programming tools.

According to one aspect of the present invention, a motor programming tool is provided for temporarily associating with an electrical connection block of a motor and sending electrical signals to a programmable controller of the motor, where the electrical connection block of the motor houses a plurality of motor terminals coupled to the controller. The programming tool includes a tool body including an interface generally corresponding with the electrical connection block of the motor for selective association therewith and wiring operable to carry the electrical signals. The wiring presents terminal ends disposed in the tool body. The programming tool also includes a plurality of terminal connecting assemblies configured to associate with the plurality of motor terminals, with each connecting assembly operably contacting a respective motor terminal upon association of the tool body with the electrical connection block of the motor. The tool body includes a shiftable locking mechanism operable to selectively secure the tool body relative to the electrical connection block of the motor. The locking mechanism includes a pivotable latch moveable between an open position, wherein the connecting assemblies are freely moveable into and out of contact with the motor terminals, and a closed position, wherein at least a portion of the pivotable latch is in contact with the motor and the connecting assemblies are restricted from moving out of contact with the motor terminals.

In a preferred embodiment, each connecting assembly includes a mounting element electrically connected to at least one terminal end of the wiring and a plunger element shiftable relative to the mounting element while maintaining electrical connection therewith. Each plunger element is biased toward an extended condition and is yieldably retracted inwardly relative to the extended condition when the tool body is associated with the electrical connection block of the motor to facilitate electrical communication between the tool and motor controller.

In one embodiment, each plunger element is configured to directly contact and thereby electrically connect to a respective motor terminal upon association of the tool body with the electrical connection block of the motor, with contact with the respective motor terminal causing the plunger element to retract from the extended position. This direct connection between the plunger and the motor terminal provides a low impact association that is quick to establish, while ensuring secure electrical connection between the tool and motor. Furthermore, this arrangement eliminates the significant insertion and separation forces required by connecting and then removing mating terminals and sockets of conventional tools.

In another embodiment, each connecting assembly includes a tool terminal element configured to directly contact and thereby electrically connect to a respective motor terminal upon association of the tool body with the electrical connection block of the motor. Each plunger element is configured to directly contact and thereby electrically connect to a respective tool terminal element, such that each tool terminal element is electrically interposed between the respective plunger element and motor terminal, with each tool terminal element being positioned to cause the respective plunger element to retract from the extended position when in contact therewith. The use of tool terminal elements may be advantageous to a customer or may simply be preferred where the motor terminals are shaped such that direct connection between the plungers and the motor terminals may not be desired. Changing or replacing the tool terminal elements, where they are used, is very quick and easy since the terminal element is not permanently connected (via crimping, soldering, or the like) to wiring of the tool, and specific length dimensions of the terminal elements is not required. This results in greater uptime and a longer useful life of the inventive motor programming tool.

In some embodiments of the invention, the circuitry connected to the wiring includes a time-delay relay element configured to sense when the connecting assemblies are operably contacting the respective motor terminals, initiate a delay, and then automatically transmit the signals to the motor controller. The time delay provided by the integrated relay helps to ensure that the electrical connection between wiring of the motor programming tool and the programmable controller of the motor is securely established before the program is transmitted to the motor controller. The circuitry also automatically provides power to the motor during programming, helping to simplify and expedite the programming process when using the inventive motor programming tool.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
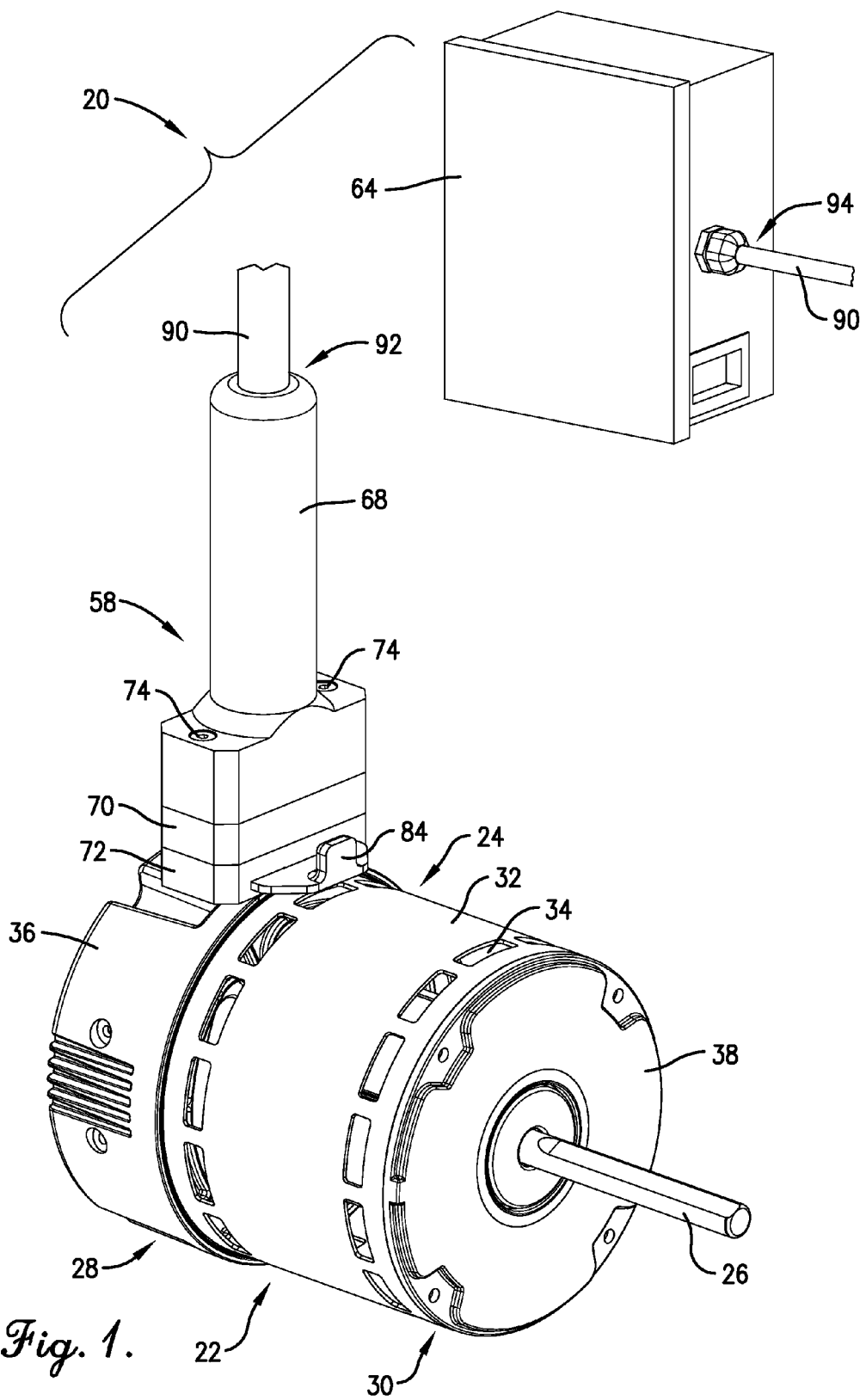
FIG. 1 is an isometric view of a motor programming tool constructed in accordance with the principles of a preferred embodiment of the present invention, shown with a tool body being associated with a motor and an enclosed control box containing circuitry for transmitting electrical signals to a programmable controller of the motor.
Figure 2:
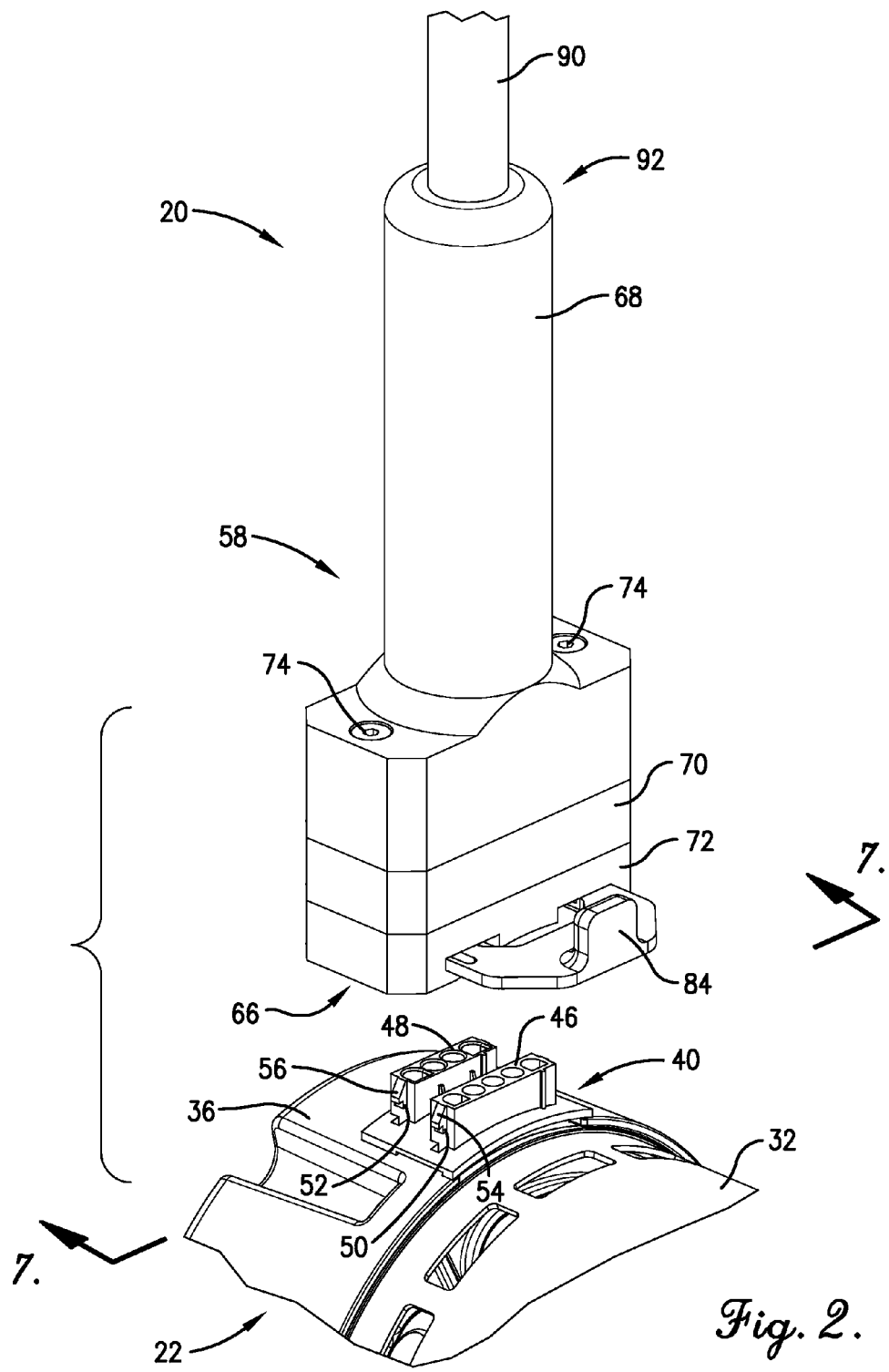
FIG. 2 is an enlarged, fragmentary, isometric view of the motor programming tool of FIG. 1, shown with the tool body being disassociated from the motor and illustrating in detail an electrical connection block of the motor.
Figure 3:
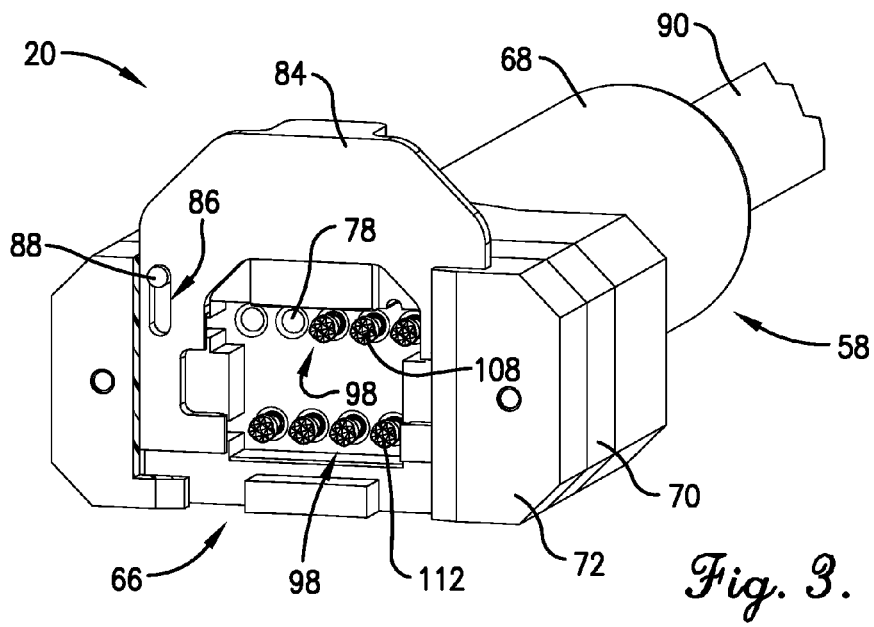
Figure 4:
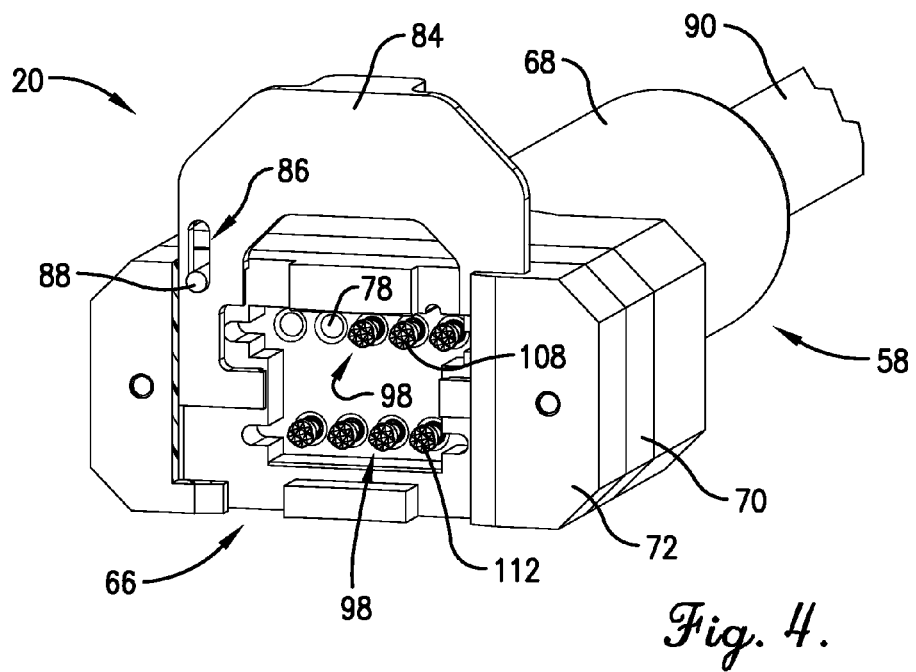
Figures 5, 6:
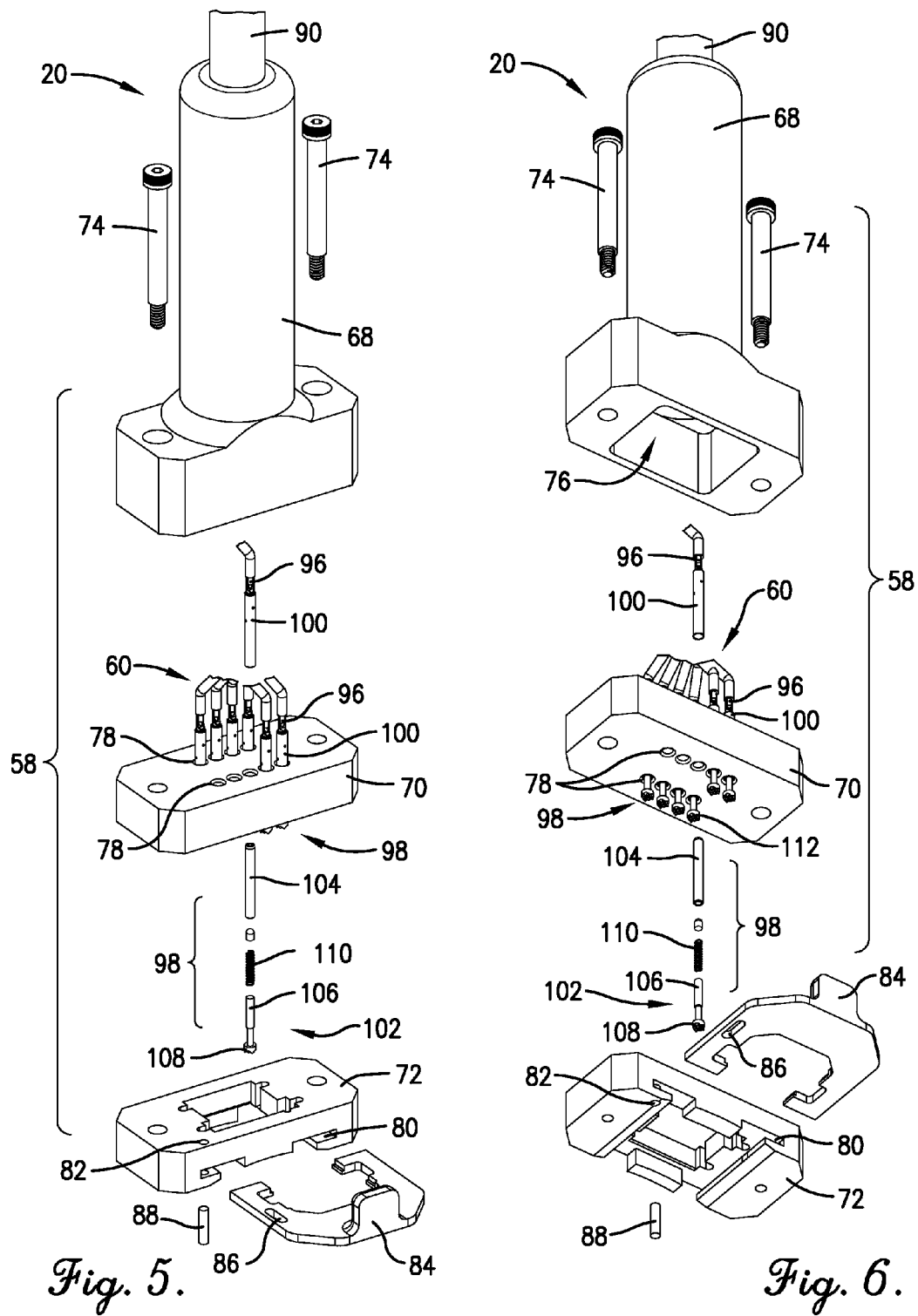
Figure 7:
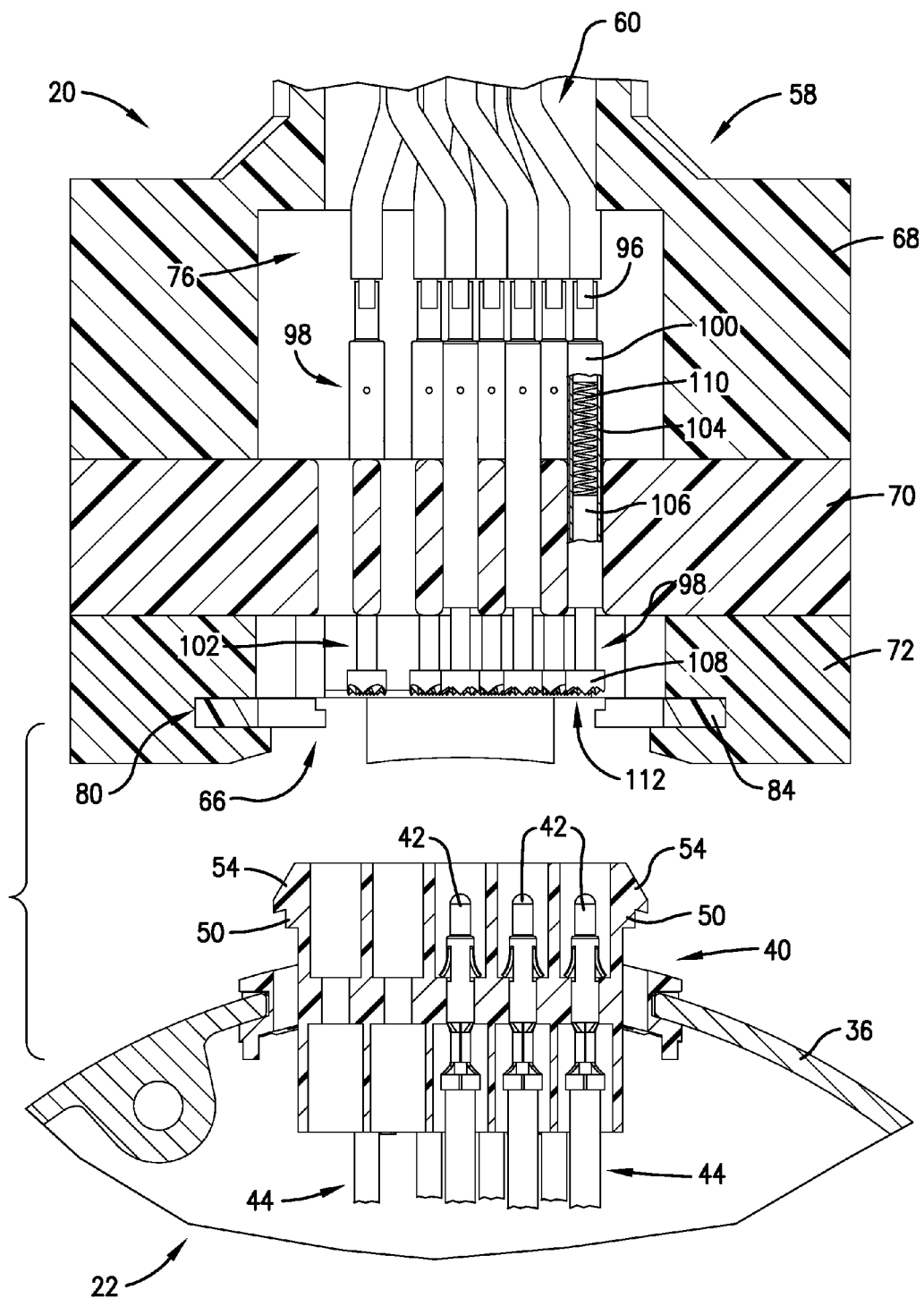
Figure 8:
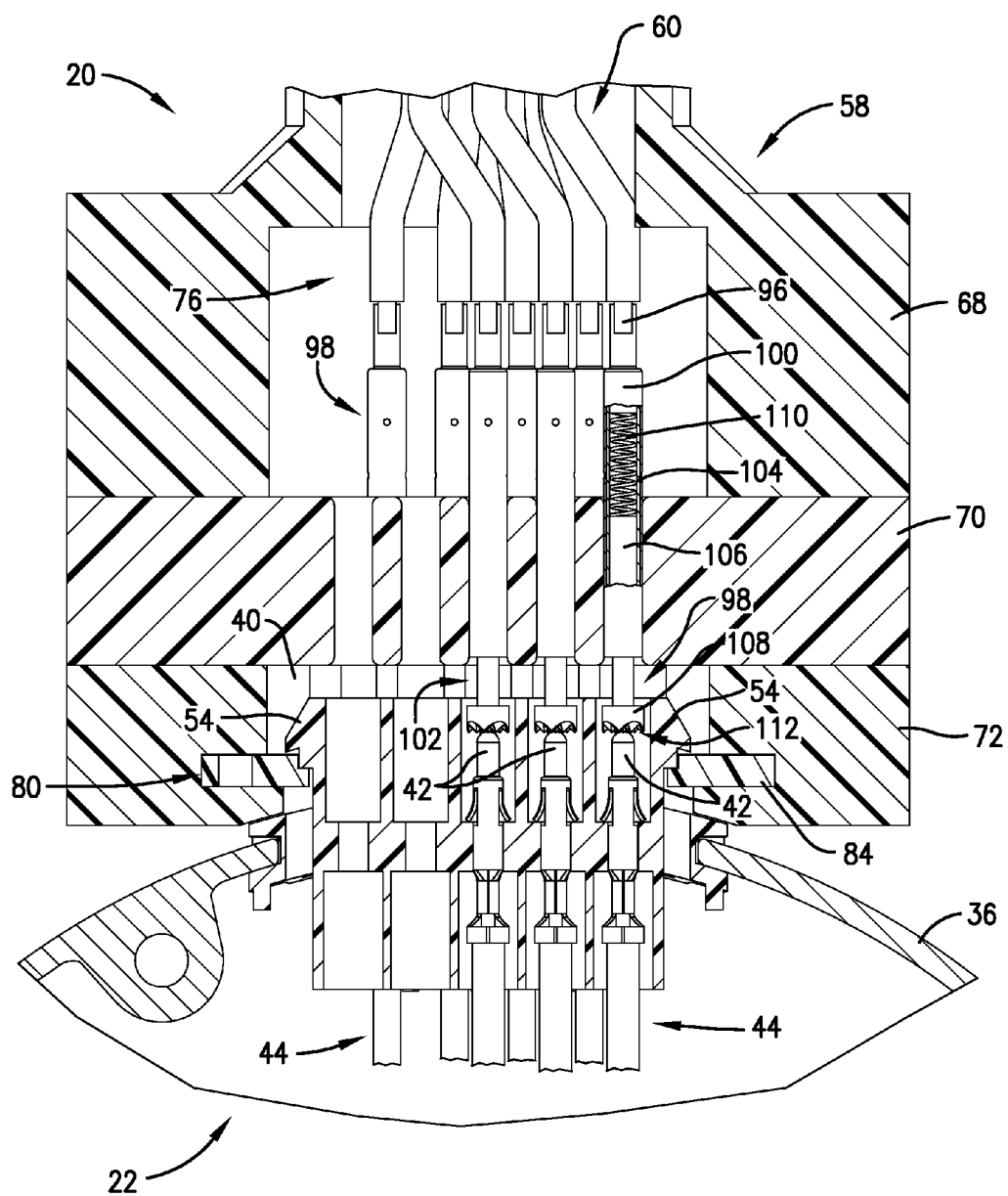
Figure 11:
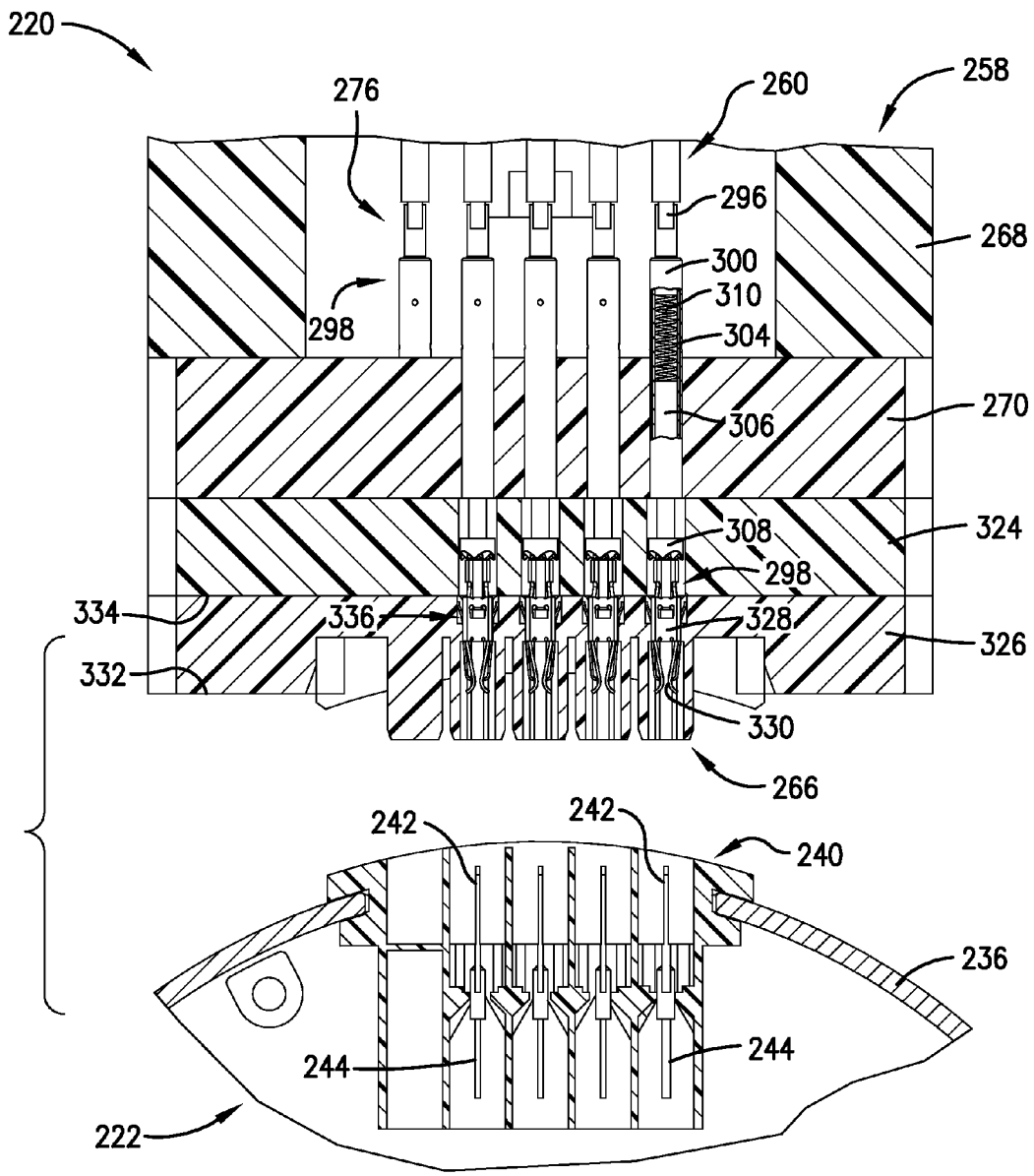
Figure 12:
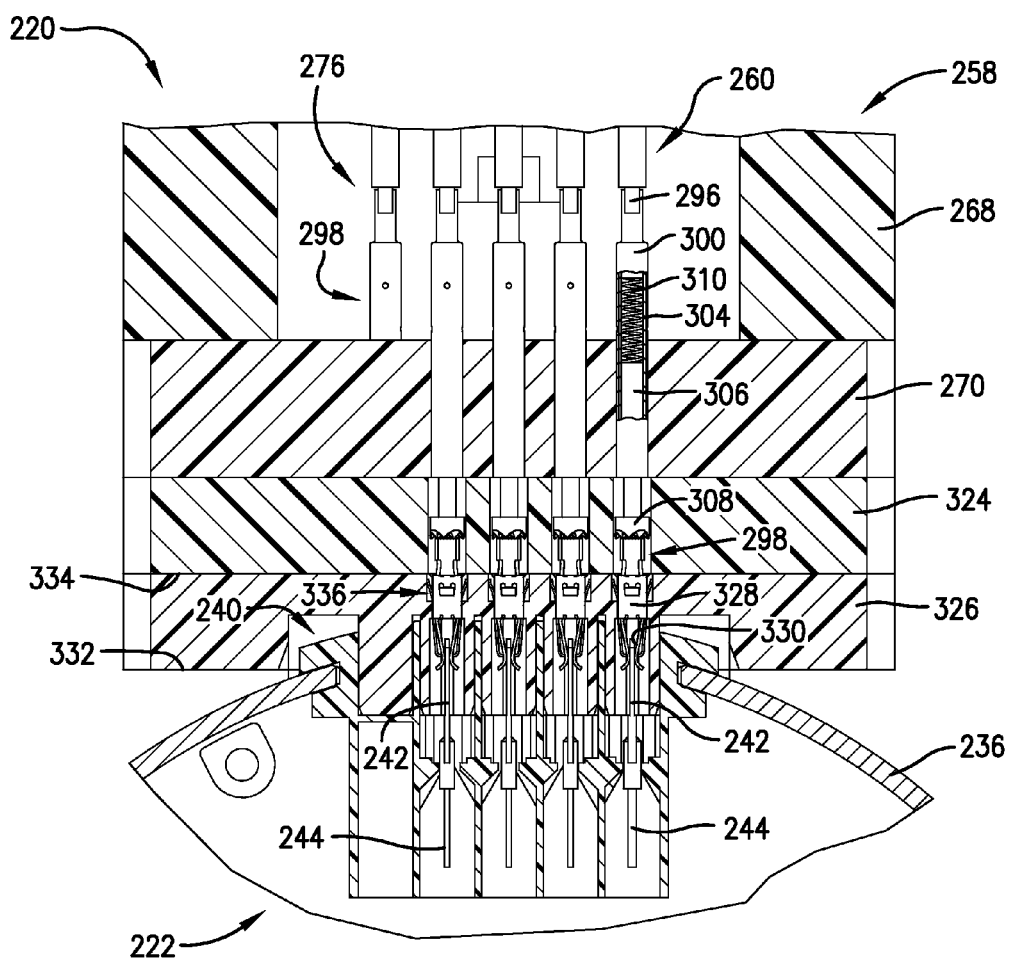
Figure 13:
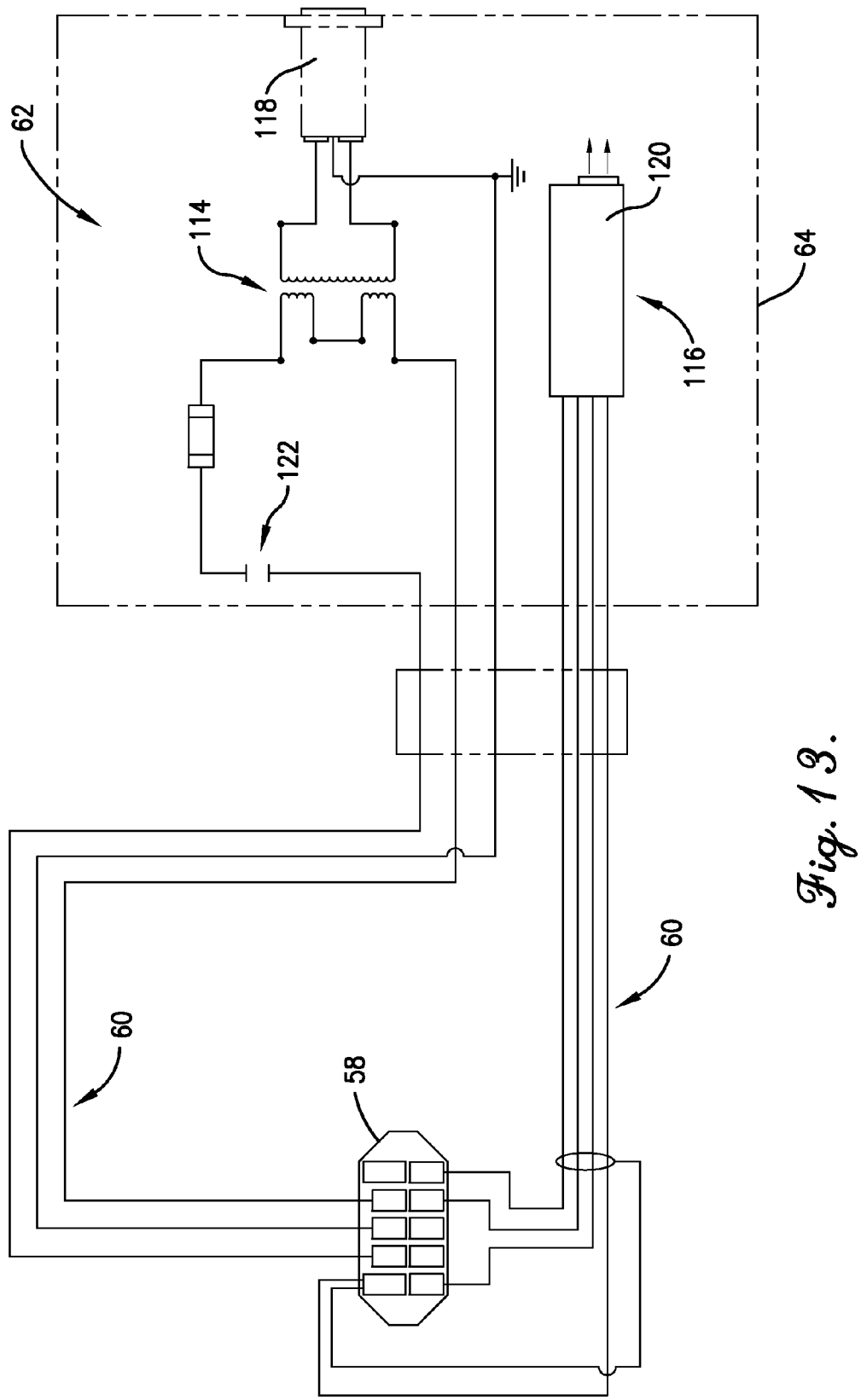
Figure 14:
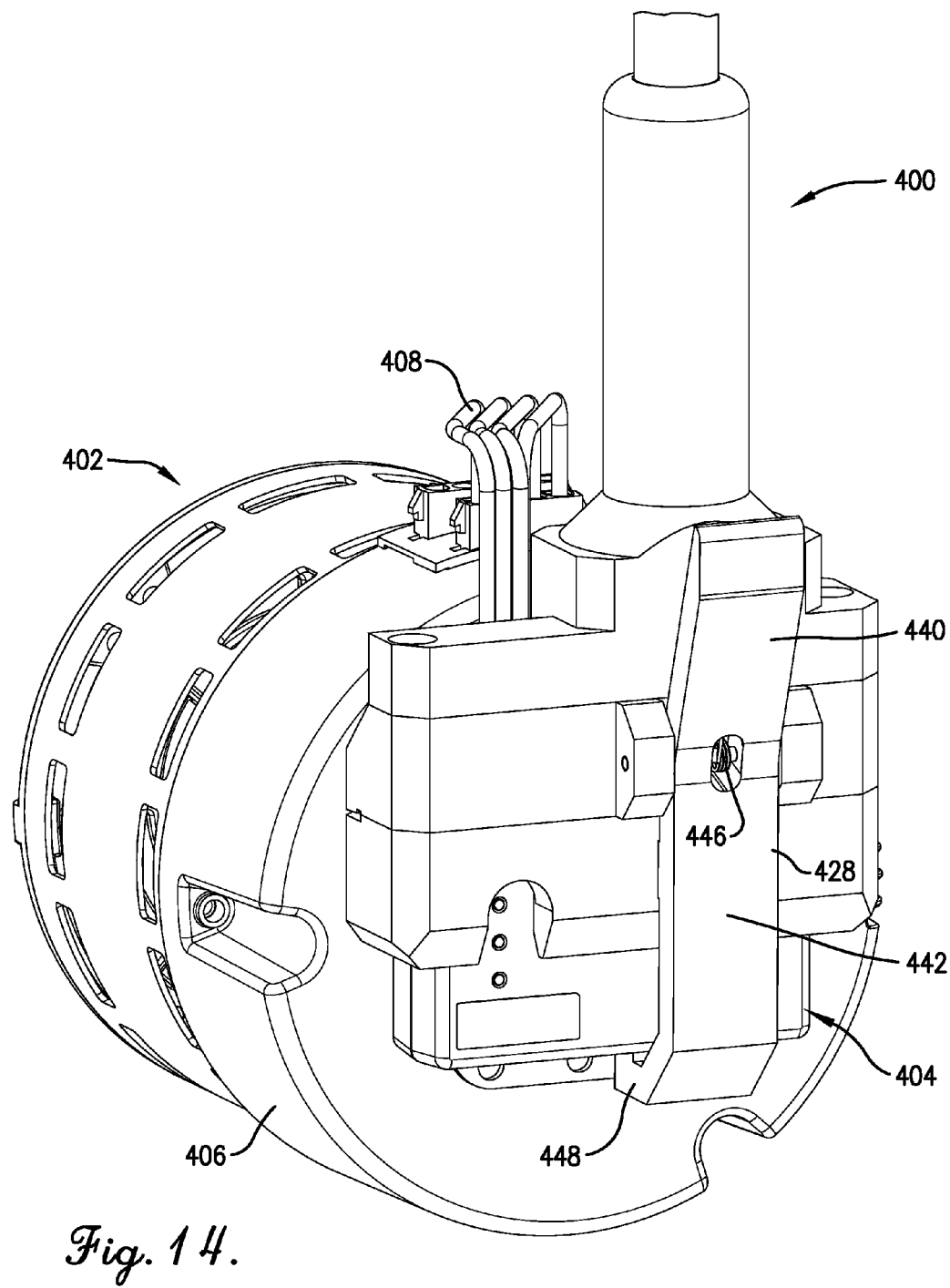
Figure 15:
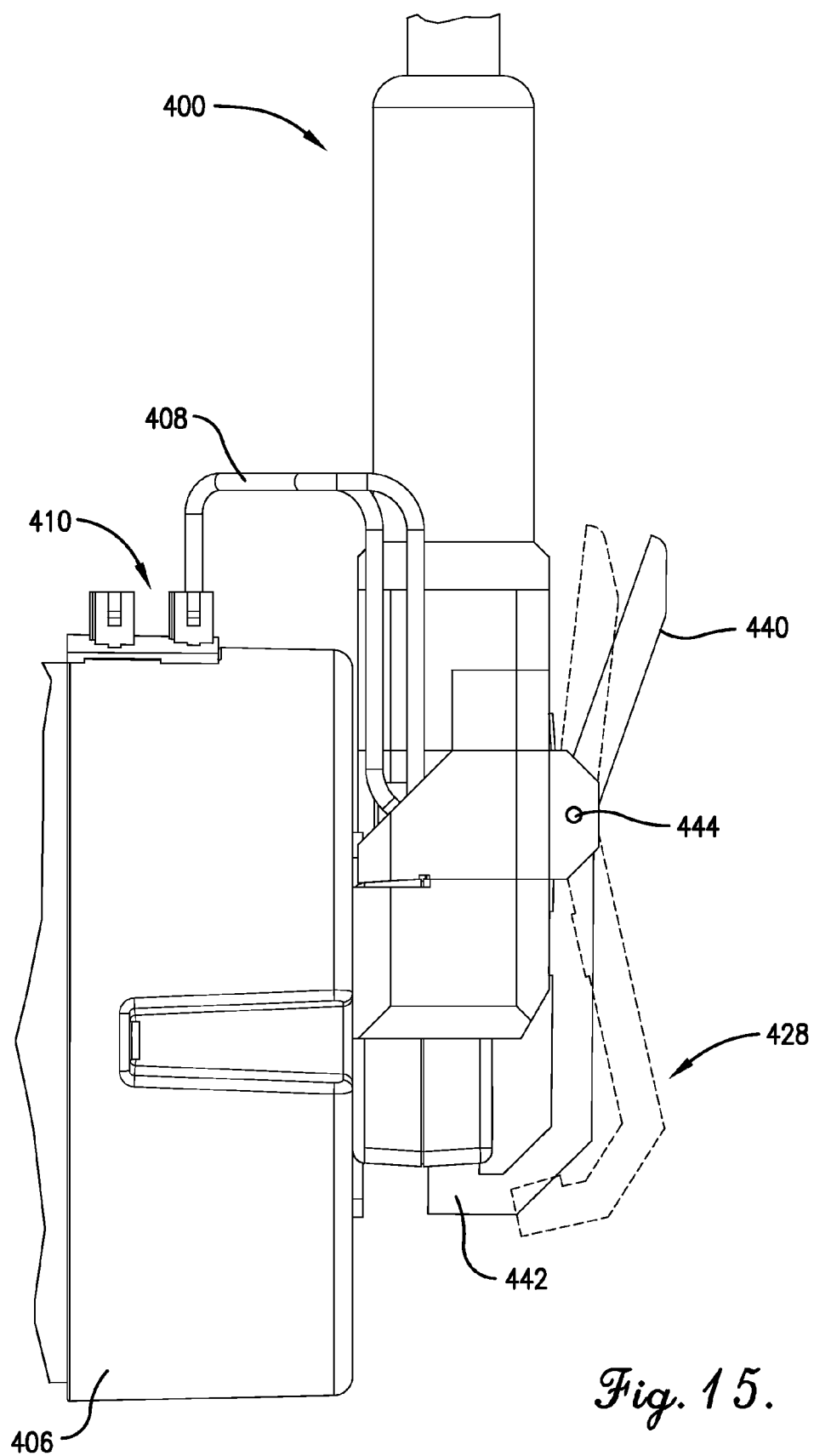
Figure 16:
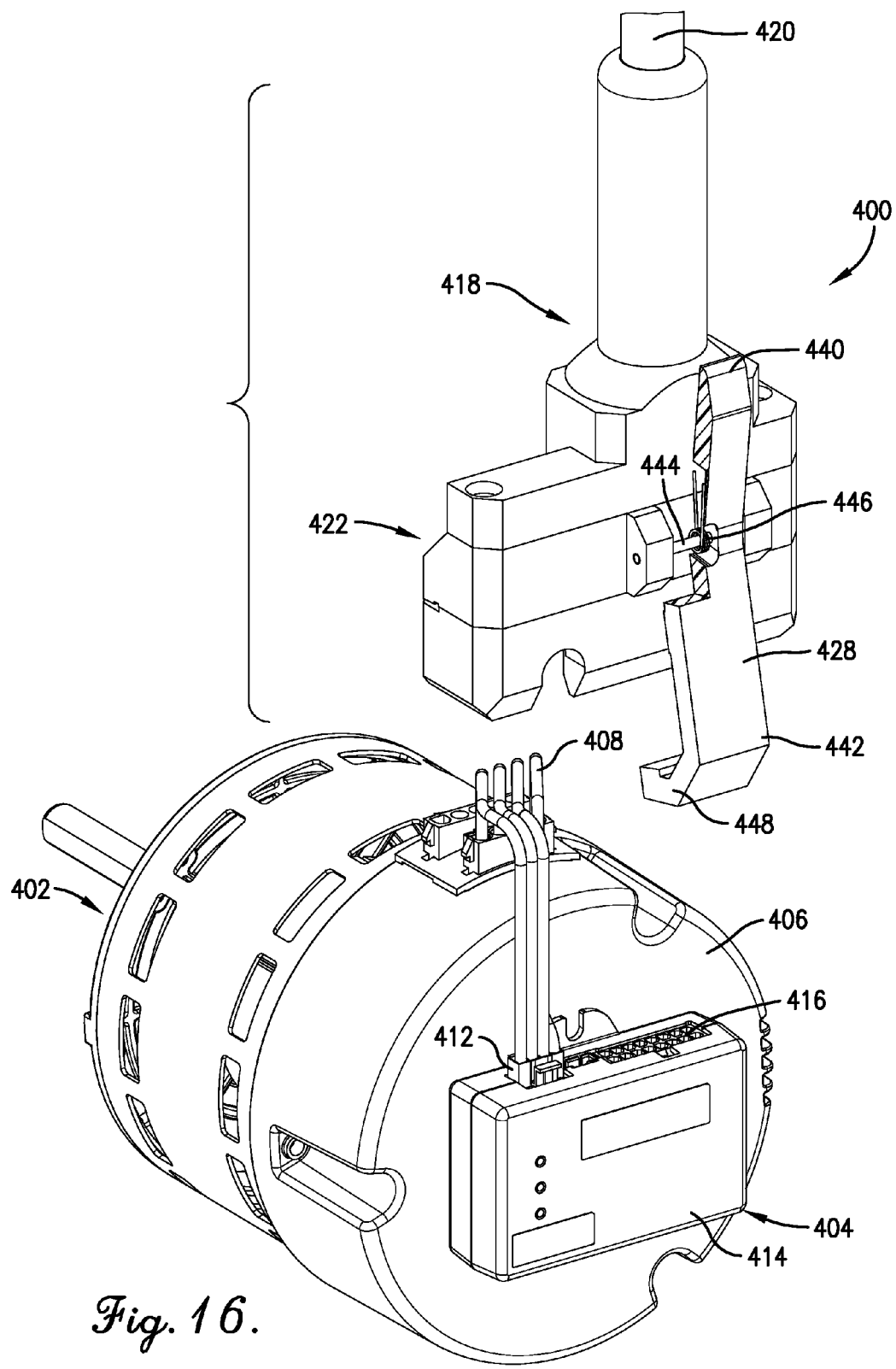
Figure 17:
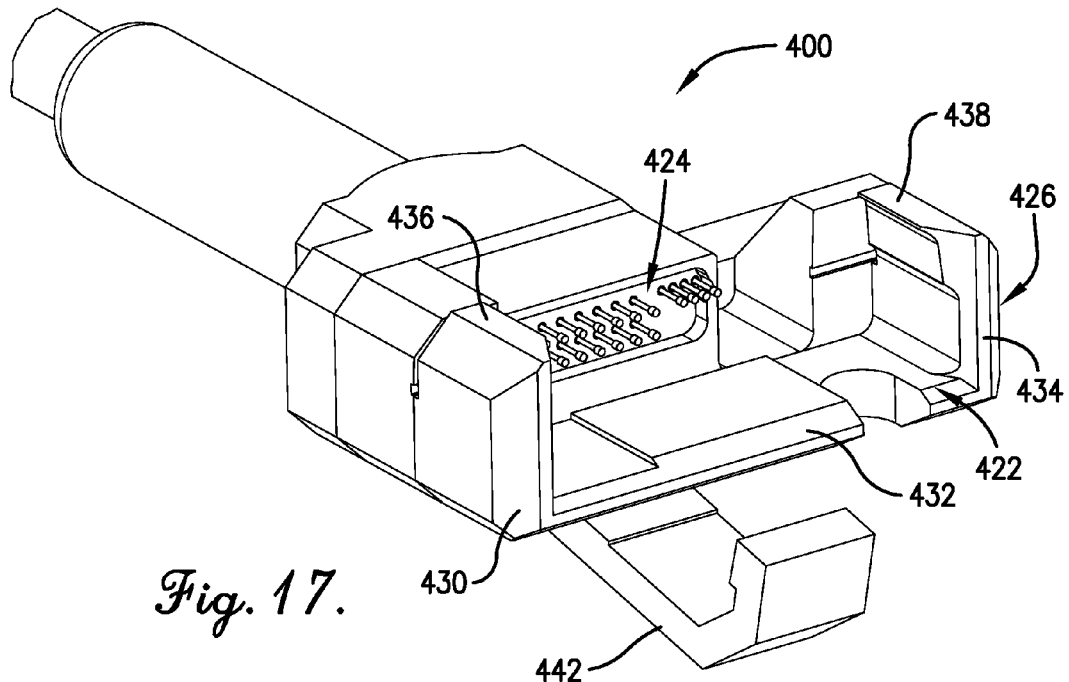
Figure 18:
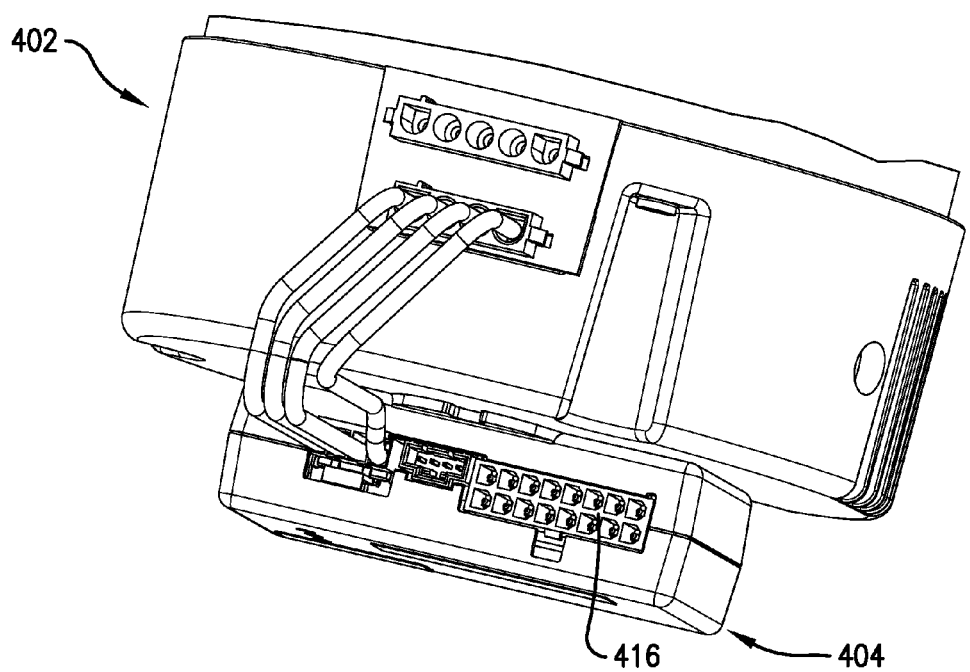

FIG. 3 is an enlarged, fragmentary, isometric view of the motor programming tool of FIGS. 1 and 2, particularly illustrating in detail an interface of the tool body with a plurality of terminal connecting assemblies configured to associate with a plurality of motor terminals of the electrical connection block of the motor, and with a locking mechanism in the form of a sliding gate element disposed in a locked condition;

FIG. 4 is an enlarged, fragmentary, isometric view of the motor programming tool of FIGS. 1-3, similar in many respects to the view of FIG. 3, but particularly illustrating in detail the sliding gate element of the locking mechanism disposed in an unlocked condition;

FIG. 5 is an exploded, isometric view of the motor programming tool of FIGS. 1-4, shown from a vantage point looking generally downwardly toward the interface, particularly illustrating details of construction of the tool body as depicted in FIGS. 3 and 4, including the plurality of terminal connecting assemblies and the locking mechanism;

FIG. 6 is an exploded, isometric view of the motor programming tool of FIGS. 1-5, similar in many respects to the view of FIG. 5, but shown from an opposite vantage point looking generally upwardly from the interface;

FIG. 7 is an enlarged, fragmentary, partial cutaway, sectional view of a portion of the motor programming tool of FIGS. 1-6 and a portion of the motor including the electrical connection block as shown in FIG. 2, taken along the line 7-7 of FIG. 2, shown with the tool body being disassociated from the motor, particularly illustrating details of construction of the tool body and corresponding elements configured for association between the motor programming tool and the connection block;

FIG. 8 is an enlarged, fragmentary, partial cutaway, sectional view of the portion of the motor programming tool depicted in FIG. 7 and similar in many respects thereto, but shown with the tool body being associated with the motor;

FIG. 9 is a fragmentary, isometric view of a portion of a motor programming tool constructed in accordance with the principles of another embodiment of the present invention, shown with a tool body being associated with a motor, similar in many respects to the motor programming tool shown in FIG. 1;

FIG. 10 is a fragmentary, isometric view of the motor programming tool of FIG. 9, shown with the tool body being disassociated from the motor and illustrating in detail an alternative electrical connection block of the motor;

FIG. 11 is an enlarged, fragmentary, partial cutaway, sectional view of a portion of the motor programming tool of FIGS. 9 and 10 and a portion of the motor including the electrical connection block as shown in FIG. 10, taken along the line 11-11 of FIG. 10, shown with the tool body being disassociated from the motor, particularly illustrating details of construction of the tool body and corresponding elements configured for association between the motor programming tool and the connection block;

FIG. 12 is an enlarged, fragmentary, partial cutaway, sectional view of the portion of the motor programming tool depicted in FIG. 11 and similar in many respects thereto, but shown with the tool body being associated with the motor;

FIG. 13 is a generally schematic electric wiring diagram of the circuitry contained within the enclosed control box of FIG. 1 and wiring connected thereto, with terminal ends of the wiring being disposed in the tool body, and with the circuitry including a time-delay relay element;

FIG. 14 is an isometric view of a motor programming tool constructed in accordance with the principles of another embodiment of the present invention, shown engaging a connection block presented by an interface controller of a motor and being secured to the interface controller by a pivoting lock mechanism;

FIG. 15 is an enlarged, fragmentary side elevation view of the motor programming tool of FIG. 14 illustrating the pivoting lock mechanism in a first, closed position and in a second, open position;

FIG. 16 is an isometric view of the motor programming tool of FIGS. 14-15, shown with the tool body being disassociated from the motor and illustrating in detail a programming interface controller of the motor, which presents an electrical connection block of the motor;

FIG. 17 is an enlarged, fragmentary isometric view of the motor programming tool of FIGS. 14-16, particularly illustrating in detail an interface of the tool body with a plurality of terminal connecting assemblies configured to associate with a plurality of motor terminals of the electrical connection block, and with a pivoting locking mechanism disposed in a locked condition;

FIG. 18 is an enlarged, fragmentary isometric view of the motor of FIG. 14, particularly illustrating in detail a controller housing and the interface controller;

FIG. 19 is an isometric view of a motor programming tool constructed in accordance with the principles of another embodiment of the present invention, the motor programming tool including circuitry disposed in a tool body, the circuitry including a power input connectable to a power source and a programming input connectable to a programming unit that generates electrical programming signals; and FIG. 20 is a partial cutaway view of the motor programming tool of FIG. 19, showing a circuit board mounted in an interface portion of the tool body, the circuit board supporting the circuitry.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIGS. 1-8, a motor programming tool 20 constructed in accordance with an embodiment of the present invention is depicted for temporarily associating with an electric motor 22.

As is generally customary, the motor 22 broadly includes a rotor assembly (not shown), rotatable about an axis, and a stator assembly (not shown). The rotor assembly and the stator assembly are both contained within an internal motor chamber that is defined by a motor case 24. As shown in FIG. 1, the rotor assembly includes an axially disposed shaft 26 that projects outwardly from one end of the motor case 24.

The motor case 24 is generally cylindrical and presents opposite axial margins 28, 30. The motor case 24 comprises a shell element 32 that includes a plurality of exhaust vent openings 34 disposed around a radially outer margin of the shell element 32 to present a vented shell. The motor case 24 further comprises a controller housing 36 and an endshield 38 disposed adjacent the axial margins 28, 30, respectively, and secured to the shell element 32.

As shown particularly in FIGS. 2, 7, and 8, an electrical connection block 40 of the motor 22 is disposed within the controller housing 36. As will be readily appreciated by one of ordinary skill in the art, the electrical connection block 40 houses a plurality of motor terminals 42 that are electrically connected to internal motor circuitry (not shown) via a plurality of wires 44. In particular, the internal motor circuitry includes a programmable controller (not shown) disposed within the controller housing 36. The programmable controller is operable to control operational characteristics of the motor 22 (e.g., speed), and is electrically connected to at least some of the motor terminals 42. With brief attention to FIGS. 7 and 8, each of the wires 44 is connected to a respective motor terminal 42 in a conventional, substantially permanent manner, such as by crimping (as shown) or by soldering.

Returning briefly to FIG. 2, the illustrated electrical connection block 40 includes a pair of generally linear protruding elements 46, 48, with each element 46, 48 housing a plurality of the motor terminals 42. In even more detail, each of the elements 46, 48 includes an opposed pair of lateral projections 50, 52, respectively. Each of the projections 50, 52 includes a tang 54, 56 to facilitate secure connection between the electrical connection block 40 and a matingly corresponding electrical connection block (not shown), as will be readily appreciated by one of ordinary skill in the art.

It is specifically noted that the particular shape of the electrical connection block 40 depicted herein is provided by way of example only, as the electrical connection block 40 could alternatively take many other shapes without departing from the teachings of the present invention. Moreover, one of ordinary skill in the art will readily understand that the disposition of the electrical connection block 40 within the controller housing 36 is also provided by way of example only, as the electrical connection block 40 could alternatively be disposed elsewhere along the motor case 24. Generally speaking, the structure and operation of the motor 22 (including the electrical connection block 40 and the programmable controller electrically connected thereto) is generally conventional in nature, as will be readily appreciated by one of ordinary skill in the art, and need not be described in further detail here. Furthermore, motor design may be otherwise varied without departing from the scope of the present invention.

Returning now to FIG. 1, the illustrated motor programming tool 20 broadly includes a tool body 58 and wiring 60 operable to carry electrical signals to the programmable controller of the motor 22. In some embodiments, the motor programming tool 20 further includes circuitry 62 disposed within an electrical enclosure 64, with the circuitry 62 being electrically connected to the wiring 60 (as shown particularly in FIG. 13 and described below).

The tool body 58 includes an interface 66 that generally matingly corresponds with the electrical connection block 40 of the motor 22, such that the interface 66 is configured for selective association therewith. In more detail regarding the illustrated embodiment, the tool body 58 further includes a proximal handle portion 68, an intermediate portion 70, and a distal connector portion 72 that presents the interface 66. The handle portion 68, the intermediate portion 70, and connector portion 72 are secured to one another with fasteners such as screws 74 (see FIGS. 5 and 6).

The handle portion 68 is substantially hollow to define a cavity 76 therein. The intermediate portion 70 defines therethrough a plurality of mounting holes 78. The connector portion 72 defines therethrough a transverse slot 80 and a pin-receiving hole 82. A sliding gate element 84 is received within the transverse slot 80, with the sliding gate element 84 defining therethrough a pin slot 86. A movement-limiting pin 88 is snugly received within the pin-receiving hole 82 of the connector portion 72. The movement-limiting pin 88 is also received within the pin slot 86 of the sliding gate element 84 to define a range of permissible movement of the sliding gate element 84 within the transverse slot 80 of the connector portion 72.

In this way, the connector portion 72 and the sliding gate element 84 of the tool body 58 cooperatively form a shiftable locking mechanism that is operable to selectively secure the tool body 58 onto the electrical connection block 40 of the motor 22. In more detail, the sliding gate element 84 is moveable between an open position (see FIG. 4), wherein the interface 66 can pass over the tangs 54, 56 to thereby be freely moveable to mate with the electrical connector block 40, and a closed position (see FIG. 3), wherein at least a portion of the sliding gate element 84 is disposed in contact with the tangs 54, 56 to thereby be restricted from moving out of contact with the electrical connector block 40.

As shown in FIG. 1, the wiring 60 extends between the circuitry 62 within the enclosure 64 and the tool body 58. In more detail, the wiring 60 is encased within a flexible conduit 90 that presents a distal end 92 (where the tool body 58 is located) and a proximal end 94 (where the enclosure 64 is located). The wiring 60 extends along the conduit 90 and into the tool body 58 (more specifically, within the cavity 76 defined within the handle portion 68). The wiring 60 presents terminal ends 96 that are disposed within the tool body 58 (see FIGS. 5-8).

With particular attention now to FIGS. 3-8, the programming tool 20 further includes a plurality of terminal connecting assemblies 98. Each of the terminal connecting assemblies 98 is configured to associate with a respective one of the plurality of motor terminals 42, with each connecting assembly 98 operably contacting a respective motor terminal 42 upon association of the tool body 58 with the electrical connection block 40 of the motor 22.

Each connecting assembly 98 broadly includes amounting sleeve element 100 and a plunger element 102 that is shiftable relative to the mounting sleeve element 100 while maintaining electrical connection therewith. Each mounting sleeve element 100 is electrically connected to at least one terminal end 96 of the wiring 60. In more detail with regard to the illustrated embodiment, each of the mounting sleeve elements 100 is fixed relative to the tool body 58. In even more detail with regard to the illustrated embodiment, each of the mounting sleeve elements 100 is secured within a respective mounting hole 78 of the intermediate portion 70 of the tool body 58 (see FIGS. 5 and 6). The terminal ends 96 of the wiring 60 may be substantially permanently connected to the mounting sleeve element 100, such as by crimping, soldering, or the like.

As shown particularly in FIGS. 7 and 8, each plunger element 102 is biased toward an extended condition and is yieldably retracted inwardly relative to the extended condition when the tool body 58 is associated with the electrical connection block 40 of the motor 22 to facilitate electrical communication between the tool 20 in the motor controller.

In the illustrated embodiment, each connecting assembly 98 further includes a barrel 104 that slidably receives a respective one of the plunger elements 102 therein. Each barrel 104 is disposed within and is electrically connected to a respective one of the mounting sleeve elements 100. The mounting sleeve element 100 and barrel 104 of each connecting assembly 98 both extend linearly along a common axis. The plunger element 102 of each connecting assembly 98 is slidable axially relative to both the barrel 104 and the mounting sleeve element 100.

In one embodiment, each pair of a barrel 104 with a plunger element 102 received therein is in turn removably received within a respective one of the fixed mounting sleeve elements 100. In this way, each pair of a barrel 104 with a plunger element 102 received therein is replaceable relative to the programming tool 20 without having to disconnect the terminal end 96 of the wiring 60 from the fixed connection at the mounting sleeve element 100.

In more detail with respect to the illustrated embodiment, the plunger element 102 includes a shaft portion 106 that is slidably received within the respective barrel 104. The plunger element 102 further includes a relatively radially enlarged head portion 108 that is disposed outside of the barrel 104. Each of the connecting assemblies 98 further includes a spring 110 that is retained axially between the shaft portion 106 of the respective plunger element 102 and an axial end of their respective barrel 104 (see FIGS. 7 and 8).

In one embodiment, as is particularly shown in FIG. 8, each plunger element 102 is configured to directly contact and thereby electrically connect to a respective motor terminal 42 upon association of the tool body 58 with the electrical connection block 40 of the motor 22. In this way, contact with a respective motor terminal 42 causes the plunger element 102 to retract from the extended position. In more detail with respect to the illustrated embodiment, each radially enlarged head portion 108 of the plunger elements 102 presents a conducting surface 112 that is configured to directly contact the respective motor terminal 42. In even more detail with respect to the illustrated embodiment, the conducting surfaces 112 are multifaceted so as to provide multiple contacting points with the respective motor terminal 42 when the tool body 58 is associated with the electrical connection block 40 of the motor 22, although alternate conducting surfaces could take other forms (e.g., planar or pointed) without departing from the teachings of the present invention.

Also in one embodiment, each plunger element 102 is configured to retract approximately one-eighth of an inch when contacting the respective motor terminal 42 upon association of the tool body 58 with the electrical connection block 40 of the motor 22 and securement of the tool body 58 on to the electrical connection block 40 of the motor 22 (such as by moving the sliding gate element 84 into the closed position as discussed above; see FIGS. 3 and 8).

In the embodiment illustrated in FIGS. 1-8, not only is each plunger element 102 configured to directly contact and thereby electrically connect to a respective motor terminal 42 upon association of the tool body 58 with the electrical connection block 40 of the motor 22, but the connecting assemblies 98 are also devoid of any receptacles for receiving the motor terminals 42 therein.

One suitable connecting assembly 98 that includes the mounting sleeve element 100 and the plunger element 102 shiftable relative to the mounting sleeve element 100 while maintaining electrical connection therewith is available from the Contact Products Group of Everett Charles Technologies of Pomona, Calif., as High Current/High Frequency Probe Model HCP-15.

Turning briefly now to FIG. 13, the circuitry 62 within the electrical enclosure 64 will be described in more detail. The circuitry 62 is electrically connected to the wiring 60, which extends into the tool body 58, and is electrically connected to the plurality of terminal connecting assemblies 98 as described above. The circuitry 62 broadly includes a power transmission portion 114 and a data transmission portion 116.

The power transmission portion 114 includes a power input 118 that is connectable to a power source (not shown) for supplying power to the motor 22 during programming. The data transmission portion 116 includes a programming input 120 in the form of a serial data connection that is connectable to a programming unit (not shown) that generates the electrical signals. Preferably, although not necessarily, the programming unit may take the form of a personal computer or other suitable device for supplying the program, which is typically supplied by a customer or other end user of the motor 22.

In the illustrated embodiment, the power transmission portion 114 of the circuitry 62 includes a time-delay relay element 122. The time-delay relay element 122 is configured to sense when the connecting assemblies 98 are operably contacting the respective motor terminals 42, initiate a time delay, and then electrically connect circuitry elements so as to automatically transmit the electrical signals to the motor controller for programming the same.

The time delay provided by the integrated time-delay relay element 122 helps to ensure that an electrical connection between the connecting assemblies 98 of the motor programming tool 20 and the programmable controller of the motor 22 is securely established before the program is transmitted to the motor controller. The circuitry 62 also automatically provides power to the motor 22 during programming, which can help to simplify and expedite the programming process when used in the motor programming tool 20, as will be readily understood by one of ordinary skill in the art upon review of this disclosure.

Preferably, although not necessarily, the time delay provided by the time-delay relay element 122 is selectively variable. In one embodiment, the time-delay relay element 122 is configured to initiate a delay of approximately 1.2 seconds before electrically connecting the circuitry elements to automatically transmit the electrical signals to the motor controller.

One suitable time-delay relay element 122 that provides a selectively variable time delay is available from McMaster-Carr of Elmhurst, Ill., as DIN-Rail Mnt Long-Life Timing Function Relay on-Delay, 24-240 VAC/VDC, Product No. 7801K51.

The operation of the motor programming tool 20 should be evident from the foregoing description, and therefore will be described here only briefly. As an initial matter, a suitable power source (not shown) and a suitable programming unit (not shown) are connected to the power transmission portion 114 and the data transmission portion 116, respectively, of the circuitry 62. In this way, the circuitry 62 within the electrical enclosure 64 is ready for sending electrical signals to the programming controller of the motor 22.

The interface 66 of the tool body 58 is generally aligned with the electrical connection block 40 of the motor 22 (see FIGS. 2 and 7). If so equipped, the sliding gate element 84 of the shiftable locking mechanism is moved into the open position (see FIG. 4). The motor programming tool 20 is then temporarily associated with the electrical connection block 40 of the motor 22 such that the terminal connecting assemblies 98 are associated with and electrically contacting the respective motor terminals 42, as described above.

In more detail, in the embodiment depicted, the plunger elements 102 of the connecting assemblies 98 are yieldably retracted inwardly relative to the extended condition to facilitate direct contact and electrical connection between the conducting surfaces 112 and the respective motor terminals 42 (see FIGS. 1 and 8). If so equipped, the sliding gate element 84 of the shiftable locking mechanism is moved into the closed position (see FIG. 3) to retain the association and electrical connection between the terminal connecting assemblies 98 and the respective motor terminals 42.

Upon association and electrical connection between the terminal connecting assemblies 98 and the respective motor terminals 42, the time-delay relay element 122 senses such operable contact, initiates a time delay, and then electrically connects circuitry elements so as to automatically transmit the electrical signals to the motor controller for programming the same. After a predetermined amount of time, during which the delay is initiated and the program is sent (something typically on the order of approximately eight to ten seconds, although this amount can vary based on the complexity of the program and the speed of the data transmission portion 116 of the circuitry 62), the tool body 58 of the motor programming tool 20 is then disassociated and removed from the electrical connection block 40 of the motor 22 by generally reversing the procedure above. The motor programming tool 20 is then ready to associate with and program another motor.

With reference now to FIGS. 9-12, another embodiment of a motor programming tool 220 is depicted for temporarily associating with an electric motor 222, wherein a similar tool body 258 and wiring 260 operably transmit electrical signals to the programmable controller of the motor 222. The motor programming tool 220 is very similar in many respects to the motor programming tool 20, with similar components between the two being numbered in similar fashion, but differing by an order of two hundred. Therefore, for the sake of brevity, only the components unique to this additional embodiment of the motor programming tool 220 will be described in detail, with a complete disclosure of the similar components being readily understood by one of ordinary skill in the art upon a review of the disclosure above.

As shown in FIGS. 10-12, the motor 222 includes an electrical connection block 240, which houses a plurality of motor terminals 242 that are electrically connected to internal motor circuitry (not shown) via a plurality of wires 244. In particular, the internal motor circuitry includes a programmable controller (not shown) that is operable to control operational characteristics (e.g., speed), and is electrically connected to at least some of the motor terminals 242. With particular attention to FIGS. 11 and 12, each of the wires 244 is connected to a respective motor terminal 242 in a conventional, substantially permanent manner, such as by crimping (as shown) or by soldering.

The electrical connection block 240, as compared with the electrical connection block 40 depicted in FIG. 2, does not include projections or tangs for facilitating a secure connection between the electrical connection block 240 and a matingly corresponding electrical connection block (not shown). Rather, as shown in FIGS. 11 and 12, the depicted motor terminals 242 are in the form of blade-type terminals, which in this embodiment rely on frictional engagement with corresponding receptacles to facilitate secure connection between the electrical connection block 240 and a matingly corresponding electrical connection block (not shown), as will be readily appreciated by one of ordinary skill in the art.

As with the electrical connection block 40 described above, the particular shape and configuration of the electrical connection block 240 is provided by way of example only, as other shapes or configurations could be used. In fact, an electrical connection block of a motor is typically configured to match a matingly corresponding electrical connection block (not shown) that is often supplied by a customer or other end user of the motor. Again, the structure and operation of the motor 222 (including the electrical connection block 240 and the programmable controller electrically connected thereto) is generally conventional in nature, as will be readily appreciated by one of ordinary skill in the art, and need not be described in further detail here.

Again, the illustrated motor programming tool 220 broadly includes the tool body 258 and wiring 260 operably transmit electrical signals to the programmable controller of the motor 222. In fact, in some embodiments, the motor programming tool 220 may further include the same circuitry 62 described above. For that matter, it is briefly noted that the circuitry 62 described above could also alternatively be used with other embodiments of motor programming tools (not shown) without departing from the teachings of some aspects of the present invention.

The tool body 258 includes an interface 266 that generally matingly corresponds with the electrical connection block 240 of the motor 222, such that the interface 266 is configured for selective association therewith. In more detail regarding the illustrated embodiment, the tool body 258 further includes a proximal handle portion 268, an intermediate portion 270, a spacer portion 324, and a distal tool terminal retaining plate portion 326 that presents the interface 266. Similar to the embodiment described above, the portions of the tool body 258 may be secured to one another with fasteners such as screws (not shown).

The handle portion 268 is substantial hollow to define a cavity 276 therein. The intermediate portion 270 defines therethrough a plurality of mounting holes 278. As in the embodiment described above, wiring 260 extends into the tool body 258 (more specifically, within the cavity 276 defined within the handle portion 268). The wiring 260 presents terminal ends 296 that are disposed within the tool body 258.

With attention especially now to FIGS. 11 and 12, the programming tool 220 further includes a plurality of terminal connecting assemblies 298. Each of the terminal connecting assemblies 298 is configured to operably associate with a respective one of the plurality of motor terminals 242, with each connecting assembly 298 being operably associated with a respective motor terminals 242 upon association of the tool body 258 with the electrical connection block 240 of the motor 222.

Similar to the embodiment described above, each connecting assembly 298 broadly includes a mounting sleeve element 300 and a plunger element 302 that is shiftable relative to the mounting sleeve element 300 while maintaining electrical connection therewith. Each mounting sleeve element 300 is electrically connected to at least one terminal end 296 of the wiring 260. In more detail with regard to the illustrated embodiment, each of the mounting sleeve elements 300 is fixed relative to the tool body 258. In even more detail with regard to the illustrated embodiment, each of the mounting sleeve elements 300 is secured within a respective mounting hole 278 of the intermediate portion 270 of the tool body 258. The terminal ends 296 of the wiring 260 may be substantially permanently connected to the mounting sleeve element 300, such as by crimping, soldering, or the like.

In the illustrated embodiment, each connecting assembly 298 further includes a barrel 304 that slidably receives a respective one of the plunger elements 302 therein. Each barrel 304 is disposed within and is electrically connected to a respective one of the mounting sleeve elements 300. The mounting sleeve element 300 and barrel 304 of each connecting assembly 298 both extend linearly along a common axis. The plunger element 302 of each connecting assembly 298 is slidable axially relative to both the barrel 304 and the mounting sleeve element 300.

In one embodiment, each pair of a barrel 304 with a plunger element 302 received therein is in turn removably received within a respective one of the fixed mounting sleeve elements 300. In this way, each pair of a barrel 304 with a plunger element 302 received therein is replaceable relative to the programming tool 220 without having to disconnect the terminal end 296 of the wiring 260 from the fixed connection at the mounting sleeve element 300.

In more detail with respect to the illustrated embodiment, the plunger element 302 includes a shaft portion 306 that is slidably received within the respective barrel 304. The plunger element 302 further includes a relatively radially enlarged head portion 308 that is disposed outside of the barrel 304. Each of the connecting assemblies 298 further includes a spring 310 that is retained axially between the shaft portion 306 of the respective plunger element 302 and an axial end of their respective barrel 304 (see FIGS. 11 and 12).

In even more detail with respect to the embodiment depicted in FIGS. 9-12, each connecting assembly 298 also includes a tool terminal element 328 that is configured to directly contact and thereby electrically connected to a respective motor terminal 242 upon association of the tool body 258 with the electrical connection block 240 of the motor to 222. In particular, as shown in FIGS. 11 and 12, each plunger element 302 is configured to directly contact and thereby electrically connect to a respective tool terminal element 328, such that each tool terminal element 328 is electrically interposed between the respective plunger element 302 and the motor terminal 242.

With continued reference to FIGS. 11 and 12, each plunger element 302 is biased toward an extended condition and is yieldably retractable inwardly relative to the extended condition. Each tool terminal element 328 is positioned to cause the respective plunger element 302 to retract from the extended position when in direct contact therewith.

In the illustrated embodiment, each of the tool terminal elements 328 includes conducting surfaces 330 that are configured to directly contact a respective one of the motor terminals 242. In more detail, the depicted tool terminal elements 328 are in the form of receptacles configured to receive blade-type motor terminals 242 (see FIGS. 11 and 12). It will be readily appreciated by one of ordinary skill in the art, however, that alternative tool terminal elements may take alternative forms without departing from the teachings of the present invention.

With attention still to FIGS. 11 and 12, the tool terminal retaining plate portion 326 of the tool body 258 is removable from the other portions of the tool body 258 (such as by screws, as described above). The tool terminal retaining plate portion 326 presents a distal interface margin 332 and an opposite proximal margin 334. The tool terminal retaining plate portion 326 also defines therethrough a plurality of tool terminal element receiving recesses 336 that extend between the distal interface margin 332 and the proximal margin 334. Each of the tool terminal elements 328 is disposed within a respective tool terminal element receiving recess 336 of the tool terminal retaining plate 326.

In more detail, each of the tool terminal element receiving recesses 336 is shaped to taper from the proximal margin 334 to the distal interface margin 332, such that a selected one of the tool terminal elements 328 may be removably received within the tool terminal element receiving recess 336 from the proximal margin 334, but is restricted from exiting the tool terminal element receiving recess 336 from the distal interface margin 332. In other words, as will be readily appreciated by one of ordinary skill in the art upon review of this disclosure, the tool terminal elements 328 are readily replaceable, with removal of the tool terminal retaining plate portion 326 from the remainder of the tool body 258 permitting replacement of the tool terminal elements 328.

In more detail, electrical decoupling of each tool terminal element 328 from the wiring 260 (as necessary for replacement thereof) requires only removal of the tool terminal element 328 from the yieldably biased contact with the respective plunger element 302. In even more detail, since each tool terminal element 328 is removable from the tool terminal retaining plate portion 326 upon separation of the tool terminal retaining plate portion 326 from the remainder of the tool body 258, each tool terminal element 328 is replaceable without having to disconnect the terminal end 296 of the wiring 260 from the fixed connection at the mounting sleeve element 300.

Operation of the motor programming tool 220 should be evident from the foregoing description, and therefore will be described here only very briefly. In short, the interface 266 of the tool body 258 is generally aligned with the electrical connection block 240 of the motor 222 (see FIGS. 10 and 11). The motor programming tool 220 is then temporarily associated with the electrical connection block 240 of the motor 222 such that the terminal connecting assemblies 298 are associated with and electrically contacting the respective motor terminals 242, as described above (more specifically, such that the conducting surfaces 330 of the tool terminal elements 328 directly contact the blade-type motor terminals 242).

Upon association and electrical connection between the terminal connecting assemblies 298 and the respective motor terminals 242, the motor programming tool 220 transmits the electrical signals to the motor controller for programming the same. After a predetermined amount of time, during which the program is sent, the tool body 258 of the motor programming tool 220 is then disassociated and removed from the electrical connection block 240 of the motor 222 by generally reversing the procedure above. The motor programming tool 220 is then ready to associate with and program another motor.

With reference now to FIGS. 14-18, another embodiment of a motor programming tool 400 is depicted for temporarily associating with an electric motor 402. The motor 402 and motor programming tool 400 are similar in some respects to the motor 22 and motor programming tool 20 describe above, with elements of the motor 402 and motor programming tool 400 generally corresponding to similarly-named elements of the motor 22 and motor programming tool 20 described above. Therefore, for the sake of brevity, only the components unique to this additional embodiment of the motor programming tool 400 will be described in detail, with a complete disclosure of the similar components being readily understood by one of ordinary skill in the art upon a review of the disclosure above.

The motor 402 is substantially similar to the motor 22 described above with the exception that the motor 402 includes a programming interface controller 404 mounted on an external surface of the controller housing 406, as best illustrated in FIGS. 16 and 18. The interface controller 404 may extend the programmability of the motor controller by including, for example, one or more programmable elements (not shown) that interact with the programmable controller of the motor 402 via a plurality of wires 408. The wires 408 interconnect the interface controller 404 with the electrical connection block 410 of the motor 402, and are operable to carry electrical power and signals to the programmable controller of the motor 402. The wires 408 connect to the interface controller 404 via a selectively removable connector 412 and may be permanently or removably connected to the electrical connection block 410 of the motor 402.

The interface controller 404 includes a generally rectangular housing 414 that includes an electrical connection block 416 disposed within the housing 414. As will be readily appreciated by one of ordinary skill in the art, the electrical connection block 416 houses a plurality of terminals (not shown) that are electrically connected to internal circuitry of the interface controller 404. Thus, the electrical connection block 416 may be similar or identical in nature to the electrical connection block 40, described above. Generally speaking, the structure and operation of the interface controller 404 (including the electrical connection block 416 and the programmable controller electrically connected thereto) are generally conventional in nature, as will be readily appreciated by one of ordinary skill in the art, and need not be described in further detail here. Furthermore, the interface controller design may be otherwise varied without departing from the scope of the present invention. The interface controller 442 may be temporarily (e.g., for programming purposes) or permanently affixed to the controller housing 406. In any case, for purposes of the present invention, the interface controller 442 presents the connection block of the motor 402 for interfacing with the tool 400.

The motor programming tool 400 is configured to associate with the connection block 416 of the interface controller 404 and communicate electrical signals to programming elements of the interface controller 404, to the programmable controller of the motor 402, or both. The motor programming tool 400 broadly includes a tool body 418 and flexible conduit 420 for carrying wire between the tool body 418 and an external component, such as an enclosure similar to the enclosure 64 described above.

An interface 422 of the tool 400 includes a plurality of terminal connecting assemblies 424, a rigid shroud 426 that defines a partially-enclosed area proximate the terminal connecting assemblies 424, and a pivotable latch 428 that is operable to selectively secure the tool body 418 onto the housing 414 of the interface controller 404. Each of the terminal connecting assemblies 424 is configured to associate with a respective one of the plurality of interface element terminals, with each connecting assembly 424 operably contacting a respective interface controller terminal upon association of the tool body 418 with the electrical connection block 416 of the interface controller 404. The terminal connecting assemblies 424 may be similar or identical in form and function to the terminal connecting assemblies 98 described above.

The shroud 426 is defined by three substantially rigid walls 430,432,434 that cooperatively define the partially enclosed area proximate the terminal connecting assemblies 424. The partially-enclosed area defined by the walls 430,432,434 of the shroud 426 at least partially corresponds to the shape of an outer surface of the interface controller housing 414 such that the shroud 426 matingly engages the interface controller 404 upon association of the tool body 418 with the electrical connection block 416 of the interface controller 404. A pair of opposing flanges 436,438 project inwardly from opposing portions of lateral walls 430,434 of the shroud 426 and slidingly engage corresponding recessed areas of the interface controller housing 414 proximate the motor 402.

The pivotable latch 428 is pivotably connected to the tool body 418 for selectively engaging the interface controller housing 414 to prevent movement of the programming tool 400 relative to the interface controller 404 when the programming tool 400 is connected to the interface controller 404. The pivotable latch 428 includes a lever portion 440 and an arm portion 442 that pivot about an axis defined by a pivot pin 444. The lever portion 440 angles away from the tool body 418 when the latch 428 is in the closed position, such that the latch 428 may be selectively pivoted between an open position (illustrated in broken lines in FIG. 15) and a closed position (illustrated in solid lines in FIG. 15). A spring element 446 is associated with the pivot pin 444 and biases the pivotable latch 428 toward the closed position.

A distal end of the arm portion 428 of the pivotable latch defines a catch element 448 that engages the interface controller housing 414 when the tool 400 is connected to the interface controller 404 and when the pivotable latch 428 is in the closed position, as illustrated in FIGS. 14 and 15.

Operation of the motor programming tool 400 should be evident from the foregoing description, and therefore will be described here only very briefly. In short, the shroud 426 of the tool body 418 is generally aligned with the electrical connection block 416 of the interface controller 404 and the pivotable latch 428 is pivoted to the open position, as illustrated in FIG. 16. The motor programming tool shroud 426 is then slid over the interface controller housing 414 such that the terminal connecting assemblies 424 are associated with and electrically contacting the respective motor terminals, as described above. The pivotable latch 428 is pivoted from the open position to the closed position (see FIG. 15). After the motor 402 is programmed, the pivotable latch 428 is pivoted to the open position and the programming tool 400 is disassociated and removed from the interface controller 404 by sliding the tool 400 upward (FIG. 16) and off of the interface controller 404.

With reference now to FIGS. 19-20, another embodiment of a motor programming tool 500 is depicted for temporarily associating with the electric motor 402. The motor programming tool 500 is similar in some respects to the motor programming tool 400 describe above, with elements of the motor programming tool 500 generally corresponding to similarly-named elements of the motor programming tool 400 described above. Therefore, for the sake of brevity, only the components unique to this additional embodiment of the motor programming tool 500 will be described in detail, with a complete disclosure of the similar components being readily understood by one of ordinary skill in the art upon a review of the disclosure above.

The motor programming tool 500 broadly includes a tool body 502 and a flexible conduit 504 for carrying wire between the tool body 502 and an external component, such as an enclosure similar to the enclosure 64 described above. The body 502 includes a handle portion 506, an intermediate portion 508, and a connector portion 510 presenting an interface similar or identical to the interface 422 described above. The intermediate portion 508 houses circuitry 512 for performing certain electrical functions of the motor programming tool 500. The circuitry 512 is similar to the circuitry 62 described above and includes both a power transmission portion and a data transmission portion. External attachment components, such as a power input similar to power input 118 and a similar physical connector associated with the data transmission portion of the circuitry, may remain in the external component or otherwise remote from the body 502 and be connected to the circuitry 512 via wiring carried by the flexible conduit 504. Thus, all elements 516 of the circuitry 512 except for external attachment components are preferably disposed in the tool body 502. If a programming input associated with the data transmission portion of the circuitry 512 includes a wireless interface, the wireless interface may be housed in the body as well.

In the illustrated embodiment, the circuitry 512 is contained on a circuit board 514, such as a printed circuit board, housed within the intermediate portion 508 of the body. The circuit board may be populated with the circuit elements and then positioned within the body. The circuitry 512 may alternatively be positioned elsewhere within the tool body 502. For example, all or a portion of the circuitry 512 may be disposed in the handle portion 506 of the tool body 502. Visual programing signals (e.g., LEDS) 518 are preferably coupled to the board and visible through the tool body 502 to signal operation of the tool 500. In the illustrated embodiment, the LEDS 518 are positioned within the intermediate portion 508 of the tool body 502.

One notable difference between the circuitry and the circuitry 62 is that the circuitry is disposed in the motor programming tool 500 while the circuitry is housed in the external enclosure 64. Because the circuitry 512 is positioned in closer physical proximity to the interface of the tool body 502, issues such as attenuation and interference that may arise from use of lengthy transmission lines between the circuitry 512 and the interface are eliminated.

Those of ordinary skill in the art will appreciate that any suitable combination of the previously described embodiments may be made without departing from the spirit of the present invention. For example, if desired, the aspect of the body-mounted circuitry (see FIGS. 19 and 20) may be combined with the tool design depicted in FIGS. 1-12.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. In combination:
   a motor including a programmable controller and a connection block, with the connection block housing a plurality of motor terminals coupled to the controller; and
   a motor programming tool temporarily associated with the connection block to send signals to the controller, said programming tool including—
      a tool body including an interface generally corresponding with the electrical connection block of the motor for selective association therewith;
      wiring operable to carry the electrical signals,
      said wiring presenting terminal ends disposed in the tool body, and
      a plurality of terminal connecting assemblies temporarily associated with the plurality of motor terminals, with each connecting assembly operably contacting a respective motor terminal,
      each connecting assembly including a mounting element electrically connected to at least one terminal end of the wiring and a plunger element shiftable relative to the mounting element while maintaining electrical connection therewith,
      each plunger element being biased toward an extended condition and being yieldably retracted inwardly relative to the extended condition when the tool body is associated with the electrical connection block of the motor to facilitate electrical communication between the tool and motor controller.

2. The combination as claimed in claim 1,
   said motor including a controller housing in which the programmable controller is housed,
   said motor including a programming interface controller located on the exterior of the controller housing,
   said interface controller presenting the connection block.

3. The combination as claimed in claim 1,
said motor programming tool including a flexible conduit having a distal end at which the tool body is located,
said wiring extending along the conduit and into the tool body.

4. The combination as claimed in claim 3,
said tool body including a proximal handle portion connected to the conduit and a distal connector portion that presents the interface.

5. The combination as claimed in claim 1,
said motor programming tool including circuitry being electrically connected to the wiring and including a time-delay relay element,
said time-delay relay element being configured to sense when the connecting assemblies are operably contacting the respective motor terminals, initiate a delay, and then automatically transmit the electrical signals to the motor controller.

6. The combination as claimed in claim 5,
said circuitry including a power input connectable to a power source and a programming input connectable to a programming unit that generates the electrical signals.

7. The combination as claimed in claim 1,
said mounting element comprising a sleeve,
each of said connecting assemblies including a barrel slidably receiving a respective one of the plunger elements therein,
said barrel being disposed within and electrically connected to a respective one of the mounting sleeves.

8. The combination as claimed in claim 7,
said sleeve and barrel of each connecting assembly extending linearly along a common axis,
said plunger element being slidable axially relative to the barrel and sleeve.

9. The combination as claimed in claim 8,
said plunger element including a shaft portion slidably received within the respective barrel and a relatively radially enlarged head portion disposed outside the barrel,
each of said connecting assemblies including a coil spring retained axially between the shaft portion of the respective plunger element and the respective barrel.

10. The combination as claimed in claim 7,
said mounting sleeves being fixed relative to the tool body,
said terminal ends of the wiring being substantially permanently connected to the mounting sleeves.

11. The combination as claimed in claim 10,
each plunger element and barrel pair being removably received within a respective one of the fixed mounting sleeves, so as to be replaceable without disconnecting the terminal ends of the wiring from the mounting sleeves.

12. The combination as claimed in claim 1,
each connecting assembly including a tool terminal element directly contacting and thereby electrically connecting to a respective motor terminal,
each plunger element being configured to directly contact and thereby electrically connect to a respective tool terminal element, such that each tool terminal element is electrically interposed between the respective plunger element and motor terminal,
each tool terminal element being positioned to cause the respective plunger element to retract from the extended position when in contact therewith.

13. The combination as claimed in claim 12,
said tool terminal elements including conducting surfaces configured to directly contact the respective motor terminals,
said tool terminal elements comprising receptacles configured to receive blade-type motor terminals.

14. The combination as claimed in claim 13,
said receptacles comprising blade-receiving jaws spring biased toward one another to securely receive blade-type motor terminals therebetween.

15. The combination as claimed in claim 12,
said tool terminal elements being replaceable, with electrical decoupling of each tool terminal element from the wiring requiring only removal from the yieldably biased contact with the respective plunger element.

16. The combination as claimed in claim 15,
said tool body further including a removable tool terminal retaining plate that at least partly defines the interface,
each tool terminal element being disposed within the tool terminal retaining plate, with removal of the tool terminal retaining plate permitting replacement of the tool terminal elements.

17. The combination as claimed in claim 16,
said tool terminal retaining plate presenting a distal interface margin and a proximal margin,
said tool terminal retaining plate defining therethrough a plurality of tool terminal element receiving recesses extending between the proximal and distal margins,
each of said recesses being shaped to taper from the proximal margin to the distal margin, such that each tool terminal element may be removably received within the recess from the proximal margin, but is restricted from exiting the recess from the distal margin.

18. The combination as claimed in claim 16,
said mounting elements being fixed relative to the remainder of the tool body,
said terminal ends of the wiring being substantially permanently connected to the mounting elements,
each tool terminal element being removable from the tool terminal retaining plate upon separation of the tool terminal retaining plate from the remainder of the tool body, so as to be replaceable without disconnecting the terminal ends of the wiring from the mounting elements.

19. The combination as claimed in claim 1,
each plunger element directly contacting and thereby electrically connecting to a respective motor terminal, with contact with the respective motor terminal causing the plunger element to retract from the extended position.

20. The combination as claimed in claim 19,
each of said plunger elements presenting a conducting surface directly contacting the respective motor terminal,
said conducting surface being multifaceted to provide multiple contacting points with the respective motor terminal.

21. The combination as claimed in claim 20,
said connecting assemblies being devoid of any receptacles for receiving the motor terminals therein.

22. The combination as claimed in claim 19,
said tool body including a shiftable locking mechanism operable to selectively secure the tool body onto the electrical connection block of the motor.

23. The combination as claimed in claim 22,
said locking mechanism including a sliding gate element moveable between an open position, wherein the connecting assemblies are freely moveable into and out of contact with the motor terminals, and a closed position, wherein at least a portion of the gate element is in contact with corresponding structure of the electrical connection block of the motor and the connecting assemblies are restricted from moving out of contact with the motor terminals.

24. The combination as claimed in claim 22, each plunger element being retracted approximately one-eighth of an inch when contacting the respective motor terminal upon association of the tool body with the electrical connection block of the motor and securement of the tool body onto the electrical connection block of the motor.

25. The combination as claimed in claim 22, said locking mechanism including a pivotable latch moveable between an open position, wherein the connecting assemblies are freely moveable into and out of contact with the motor terminals, and a closed position, wherein at least a portion of the pivotable latch is in contact with the motor and the connecting assemblies are restricted from moving out of contact with the motor terminals.

26. The combination as claimed in claim 25, said interface including a shroud removably receiving a portion of the motor therein, said latch releasably engaging the portion of the motor.

27. The combination as claimed in claim 26, said portion of the motor comprising a motor programming interface controller.

28. In combination:

a motor including a programmable controller and a connection block, with the connection block housing a plurality of motor terminals coupled to the controller; and a motor programming tool temporarily associated with the connection block to send signals to the controller, said programming tool including— a tool body including an interface generally corresponding with the electrical connection block of the motor for selective association therewith, wiring operable to carry the electrical signals, said wiring presenting terminal ends disposed in the tool body, a plurality of terminal connecting assemblies configured to associate with the plurality of motor terminals, said connecting assemblies being in electrical communication with the terminal ends of the wiring, each connecting assembly operably contacting a respective motor terminal, and circuitry being electrically connected to the wiring and including a time-delay relay element, said time-delay relay element being configured to sense when the connecting assemblies are operably contacting the respective motor terminals, initiate a delay, and then automatically transmit the electrical signals to the motor controller.

29. The combination as claimed in claim 28, said delay of the relay being selectively variable.

30. The combination as claimed in claim 28, said circuitry including a power input connectable to a power source and a programming input connectable to a programming unit that generates the electrical signals.

31. The combination as claimed in claim 28, said time-delay relay element initiating a delay of approximately 1.2 seconds before completing a circuit to automatically transmit the electrical signals to the motor controller.

* * * * *